United States Patent
Steffens, Jr.

[11] Patent Number: 6,119,546
[45] Date of Patent: Sep. 19, 2000

[54] APPARATUS FOR A STEERING WHEEL ASSEMBLY

[75] Inventor: Charles E. Steffens, Jr., Washington, Mich.

[73] Assignee: TRW Vehicle Safety Systems Inc., Lyndhurst, Ohio

[21] Appl. No.: 09/150,179

[22] Filed: Sep. 10, 1998

[51] Int. Cl.[7] .............................. B62D 1/04; B60R 21/16
[52] U.S. Cl. .................... 74/552; 70/210; 70/237; 70/252; 180/731; 280/287; 403/300; 411/110; 411/948
[58] Field of Search ........................ 70/210, 237, 252; 74/552; 180/287; 280/731; 403/300; 411/110, 948

[56] References Cited

U.S. PATENT DOCUMENTS

| | | | |
|---|---|---|---|
| 5,172,607 | 12/1992 | Wu | 74/552 |
| 5,595,078 | 1/1997 | Harrell | 70/209 |
| 5,692,770 | 12/1997 | Scharboneau et al. | 280/728.2 |
| 5,826,448 | 10/1998 | Graham | 70/209 |

*Primary Examiner*—Allan D. Herrmann
*Attorney, Agent, or Firm*—Tarolli, Sundheim, Covell, Tummino & Szabo L.L.P.

[57] ABSTRACT

An apparatus is provided for use in a vehicle having a rotatable steering shaft (32) and a locking mechanism (56) for preventing rotation of the steering shaft. The locking mechanism (56) is deactivated by an ignition key (58) in the vehicle's ignition. The apparatus comprises a vehicle steering wheel assembly (20) having a front side (68) facing a driver of the vehicle and a back side facing away from the driver, an inflatable vehicle occupant protection device (90) for helping to protect the driver of the vehicle in a vehicle collision, and a mechanism (60, 110) for removably connecting the inflatable vehicle occupant protection device (90) with the steering shaft (32). The mechanism (60, 110) for removably connecting the inflatable vehicle occupant protection device (90) requires rotation of the steering wheel assembly (20) to accomplish removal of the inflatable vehicle occupant protection device from the steering shaft (32).

41 Claims, 11 Drawing Sheets

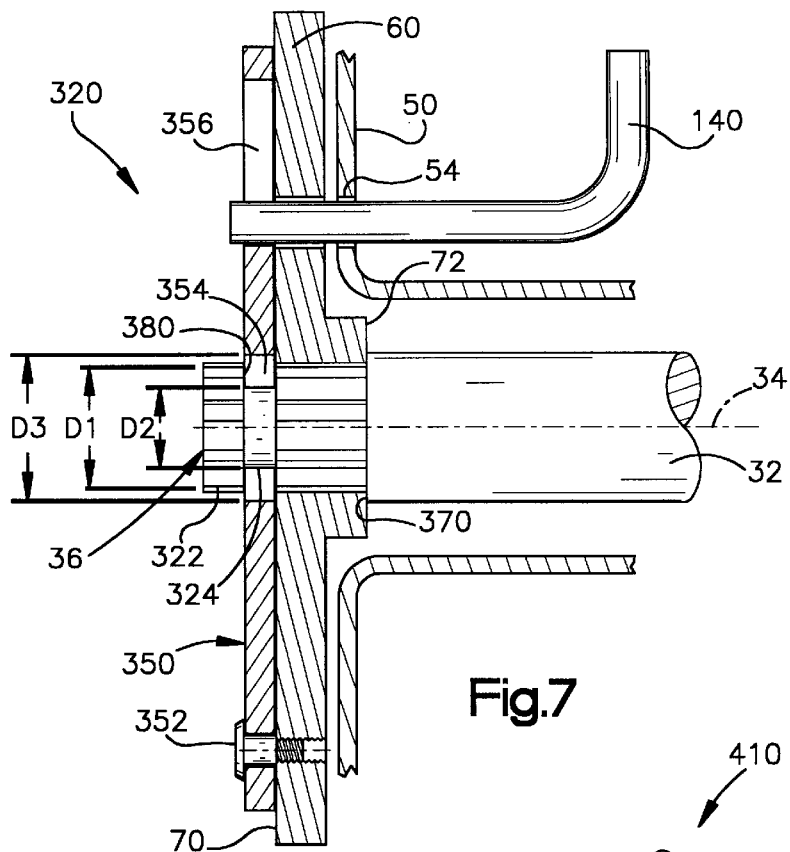
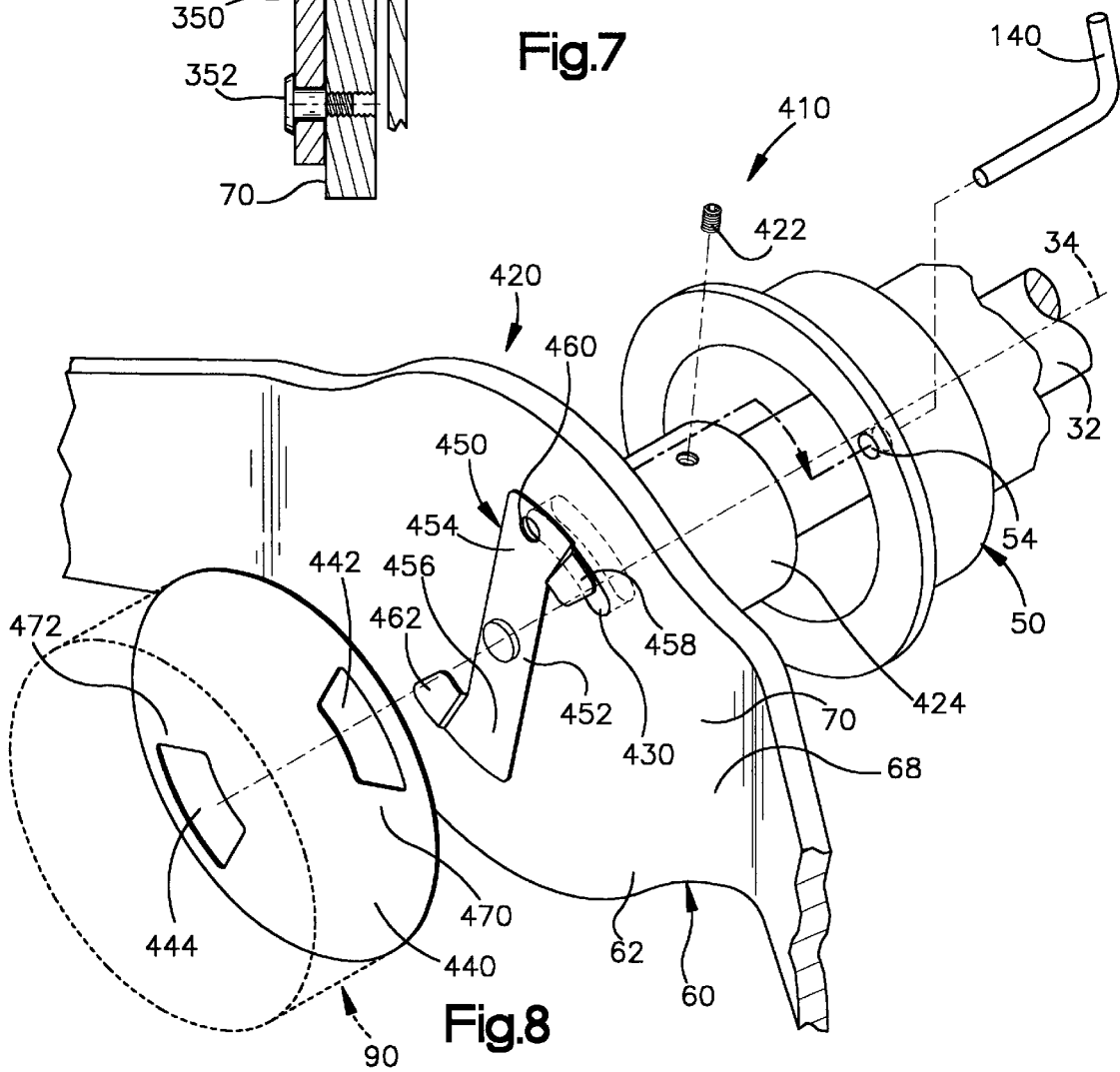

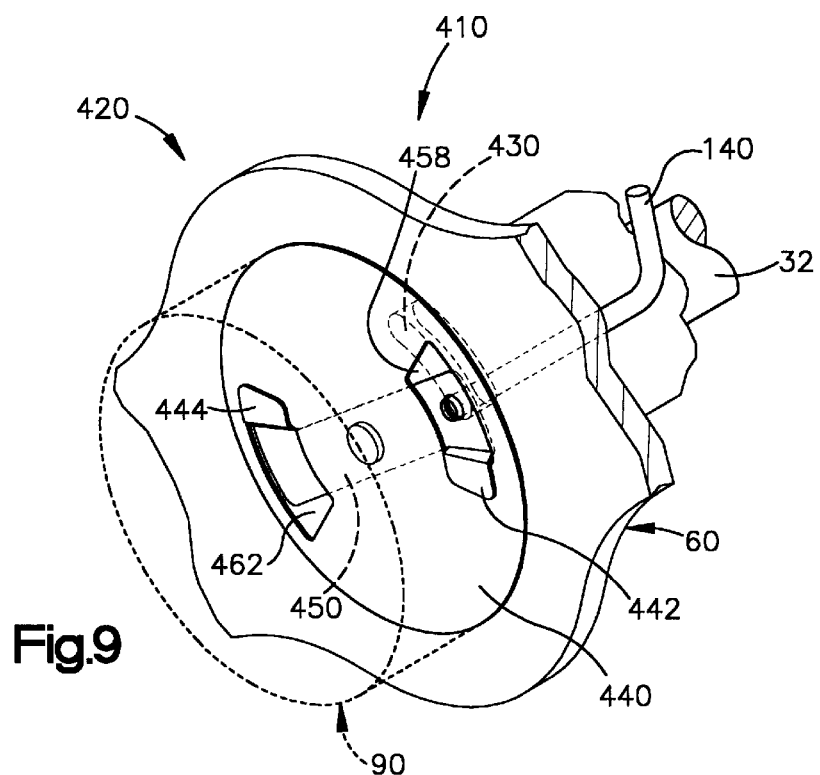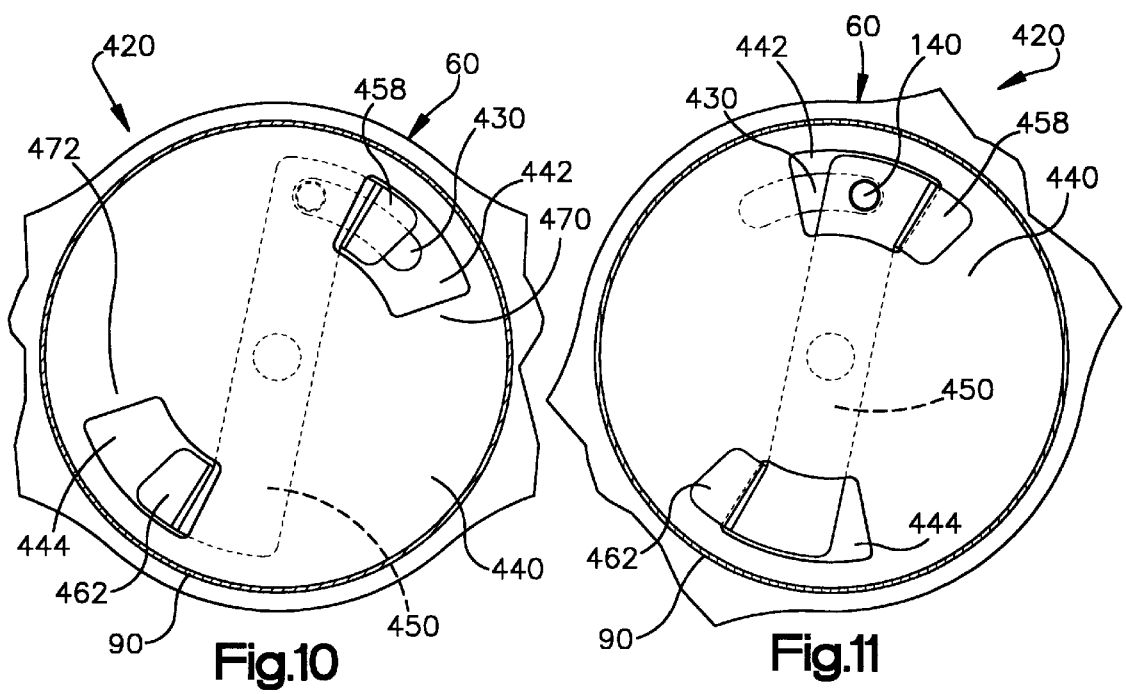

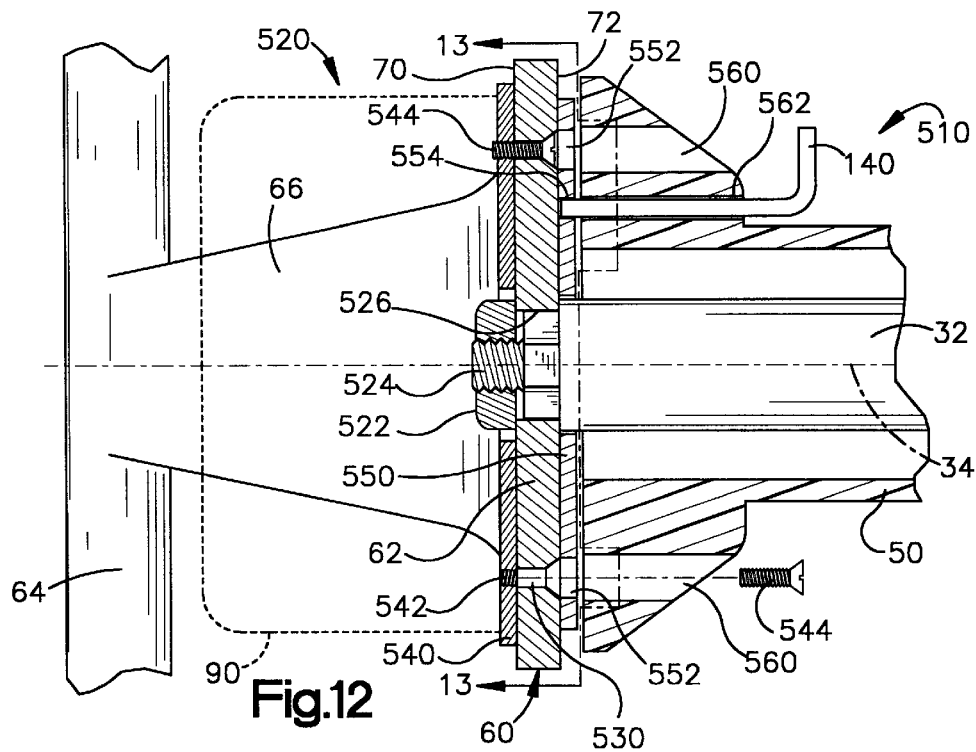
Fig.12
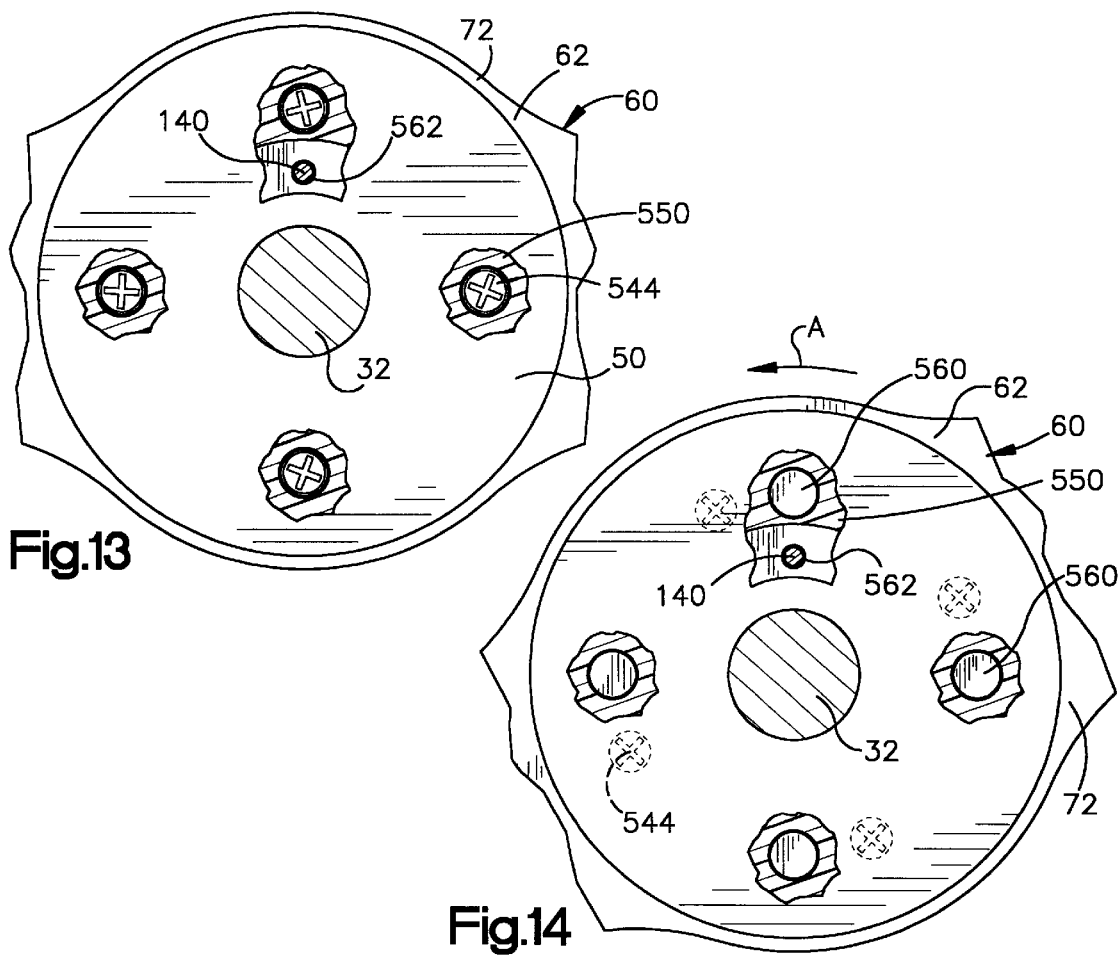
Fig.13
Fig.14

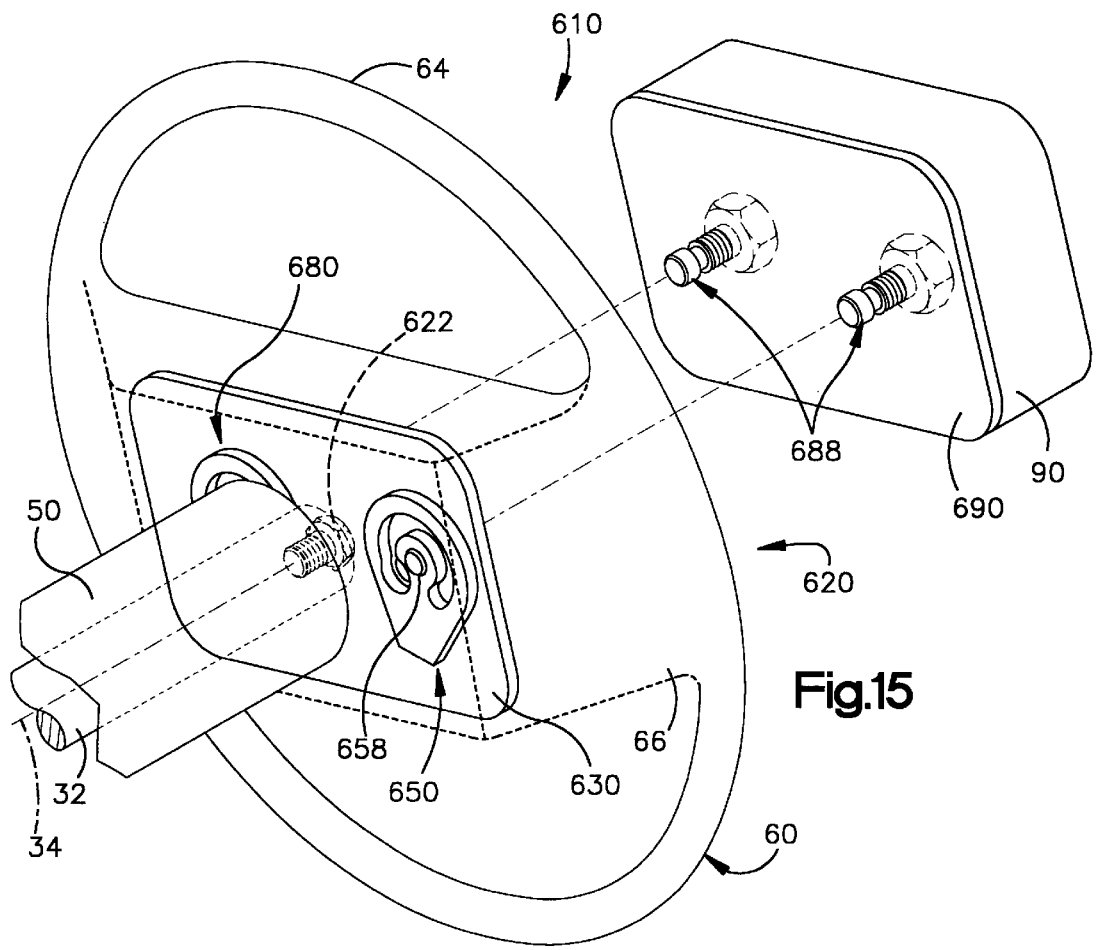
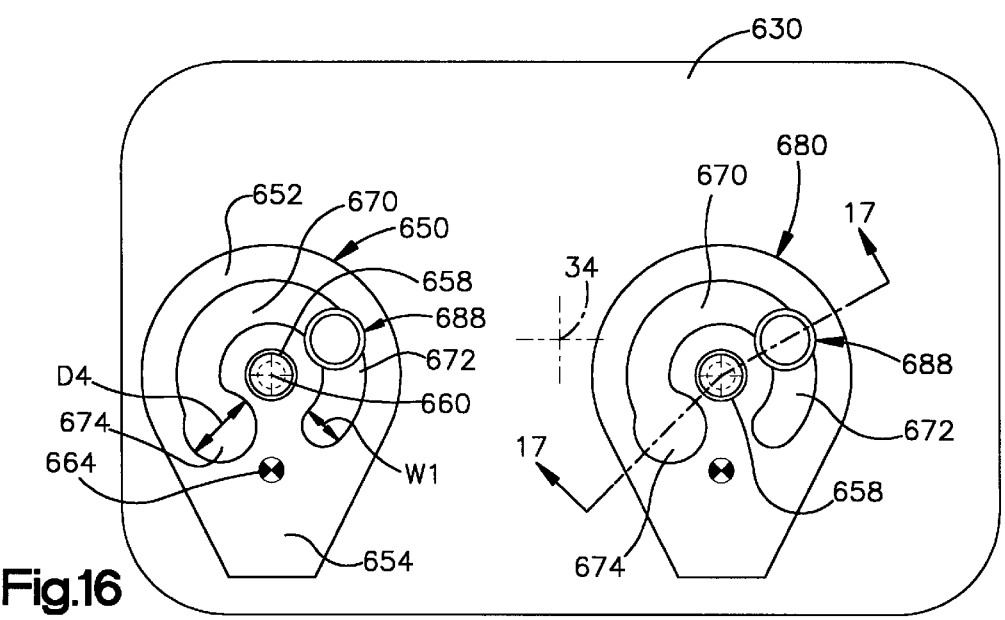
Fig.15
Fig.16

APPARATUS FOR A STEERING WHEEL ASSEMBLY

FIELD OF THE INVENTION

The present invention is directed to an apparatus for use with a steering wheel assembly. More particularly, the invention is directed to an apparatus for use in a vehicle having a steering wheel mounted on a rotatable steering shaft, an air bag module mounted on the steering wheel, and a locking mechanism for preventing rotation of the steering shaft and the steering wheel.

BACKGROUND OF THE INVENTION

As a means for deterring and preventing vehicle theft, most vehicles are equipped with a locking mechanism for preventing rotation of the vehicle steering shaft. When the locking mechanism is locked, only a small amount of rotation of the steering shaft and associated steering wheel is permitted. The typical locking mechanism is deactivated when a vehicle-specific ignition key is inserted into a corresponding ignition keyhole arranged on the steering column and subsequently turned. When the vehicle is parked (i.e., the vehicle ignition is turned OFF and the key is removed), it is typical for the steering wheel to be oriented such that the vehicle is pointed for travel in a generally straight line.

Most new vehicles are also equipped with a driver-side inflatable vehicle occupant protection device in the form of an air bag module mounted to the vehicle steering wheel to help protect the driver of the vehicle from injury in the event of a vehicle collision. Because of the relatively high cost of an unactuated driver-side air bag module, theft of these steering wheel mounted air bag modules has become common.

Recently, so-called "integrated" steering wheel assemblies have been suggested in which a driver-side air bag module is incorporated into a steering wheel assembly prior to installation of the steering wheel assembly in the vehicle. It is common for the air bag module in an integrated steering wheel assembly to be covered by a non-removable air bag module cover. As a result, theft of such an integrated air bag module involves theft of the entire integrated steering wheel assembly, which is more costly to replace than just an air bag module.

Accordingly, it is an object of the present invention to provide an apparatus for preventing the theft of a driver-side air bag module mounted in a vehicle steering wheel.

Further, it is an object of the present invention to provide an apparatus for preventing the theft of an integrated steering wheel assembly having a driver-side air bag module incorporated in the assembly.

SUMMARY OF THE INVENTION

The present invention is an apparatus for use in a vehicle having a rotatable steering shaft and locking means for preventing rotation of the steering shaft. The locking means for preventing rotation of the steering shaft is deactivated by an ignition key in the vehicle's ignition. The apparatus comprises a vehicle steering wheel having a front side facing a driver of the vehicle and a back side facing away from the driver, an inflatable vehicle occupant protection device for helping to protect the driver of the vehicle in a vehicle collision, and means for removably connecting the inflatable vehicle occupant protection device with the steering shaft. The means for removably connecting the inflatable vehicle occupant protection device requires rotation of the steering wheel to accomplish removal of the inflatable vehicle occupant protection device from the steering shaft.

In accordance with certain embodiments of the present invention, the means for removably connecting the inflatable vehicle occupant protection device for rotation with the steering shaft comprises means for removably attaching the steering wheel to the steering shaft.

In accordance with other embodiments of the present invention, the means for removably connecting the inflatable vehicle occupant protection device for rotation with the steering shaft includes means for removably connecting the inflatable vehicle occupant protection device to the steering wheel.

BRIEF DESCRIPTION OF THE DRAWINGS

The foregoing and other features of the invention will become more apparent to one skilled in the art upon consideration of the following description of the invention and the accompanying drawings in which:

FIG. 3 is a view taken along line 3—3 in FIG. 2;

FIG. 7 is a partial sectional view taken along line 7—7 of FIG. 6;

FIG. 8 is an exploded perspective view of a fourth embodiment of the present invention;

FIG. 9 is a perspective view of a portion of FIG. 8;

FIG. 10 is a plan view of a portion of FIG. 8 illustrating a disengaged condition of the parts shown in FIG. 8;

FIG. 11 is a view similar to FIG. 10 illustrating the engaged condition of the parts shown in FIG. 8;

FIG. 12 is a partial sectional view of a fifth embodiment of the present invention;

FIG. 13 is a view taken along line 13—13 in FIG. 12;

FIG. 14 is a view similar to FIG. 13 but with parts in different positions;

FIG. 15 is an exploded perspective view of a sixth embodiment of the present invention;

FIG. 16 is a plan view of a portion of FIG. 15;

DESCRIPTION OF PREFERRED EMBODIMENTS

Figure 1:
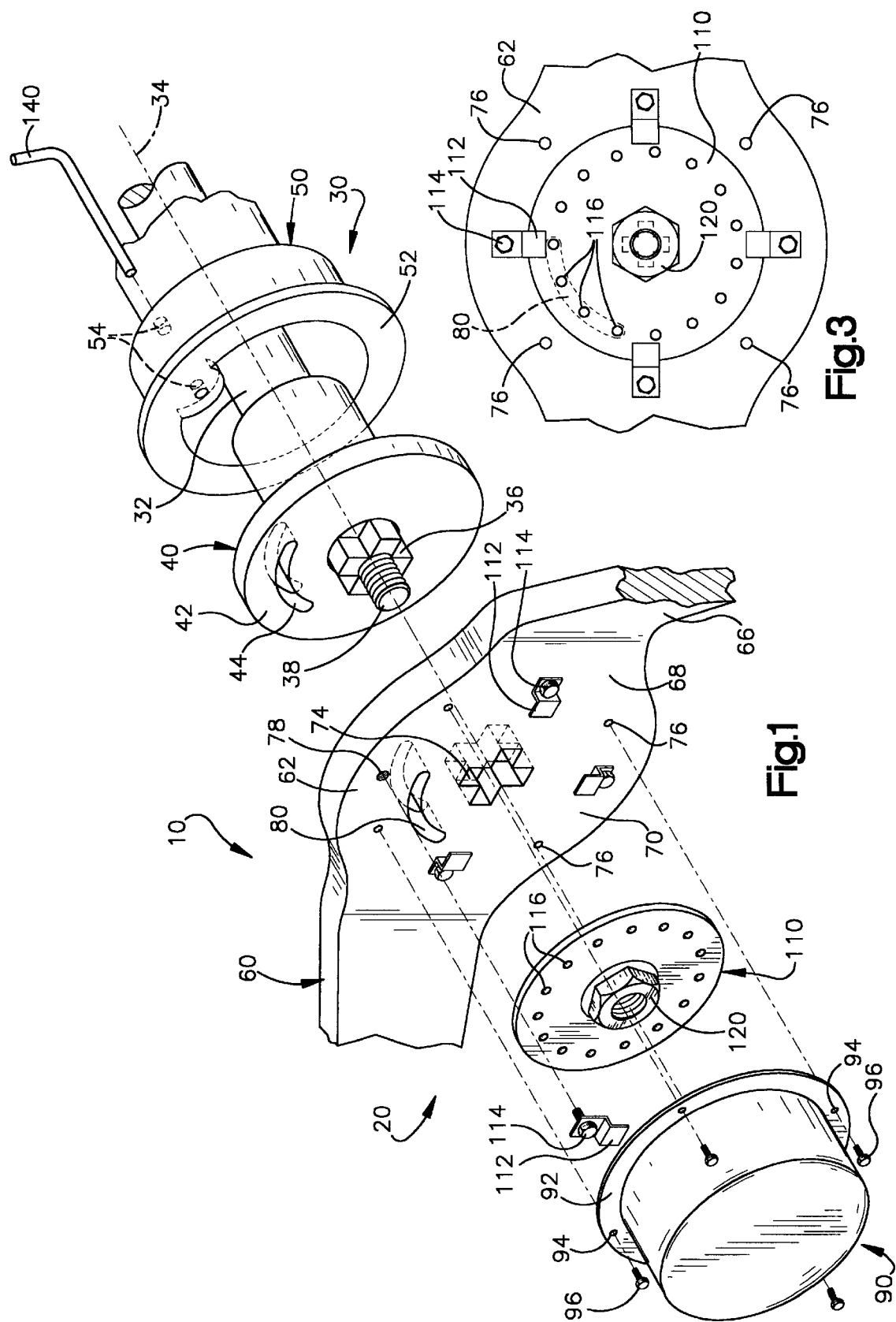
FIG. 1 is an exploded perspective view of a vehicle steering wheel assembly constructed in accordance with a first embodiment of the present invention.
Figure 2:
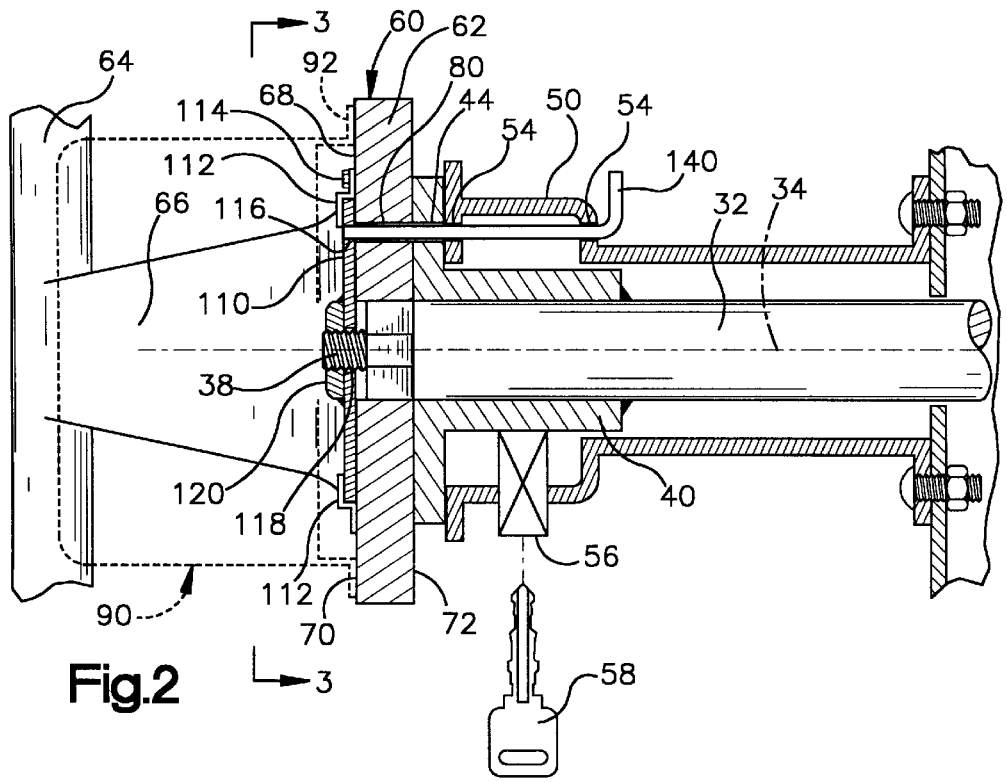
FIG. 2 is a partial sectional view of parts shown in FIG. 1.

An apparatus 10 for a vehicle steering wheel assembly 20 is illustrated in FIGS. 1 and 2. The steering wheel assembly 20 mounts to a steering column 30 in the vehicle. The steering column 30 includes a rotatable steering shaft 32 which is centered on an axis 34 and which is operatively connected to steerable wheels (not shown) of the vehicle.

The steering shaft 32 has an end portion 36 with a splined configuration for non-rotatably attaching the steering wheel assembly 20 to the steering shaft. An externally threaded extension 38 projects axially from the end portion 36 of the steering shaft 32. A hub member 40 is fixedly attached to the steering shaft 32 adjacent the end portion 36. The hub member 40 includes a disk-shaped portion 42 having a first arcuate slot 44 which extends axially through the disk-shaped portion.

The steering column 30 includes a stationary enclosure member 50 surrounding a portion of the steering shaft 32 and the hub member 40. A radially extending surface 52 of the enclosure member 50 lies adjacent the disk-shaped portion 42 of the hub member 40. The enclosure member 50 includes a pair of aligned openings 54 which extend axially and which align with the first arcuate slot 44 in the disk-shaped portion 42 of the hub member 40.

The steering column 30 further includes a known key-operated ignition locking mechanism, indicated schematically at 56 in FIG. 2, which is operable to lock the steering column 30 and thereby prevent rotation of the steering shaft 32. The locking mechanism 56 is deactivated by the insertion and subsequent rotation of a vehicle-specific ignition key 58. Future "key" systems, such as an electronic smart key which may not require turning of the key, are also envisioned.

The steering wheel assembly 20 includes a vehicle steering wheel 60, an inflatable occupant protection device or air bag module 90, and an attachment plate 110. The steering wheel 60 comprises a central portion 62, a ring-shaped rim portion 64 (FIG. 2), and a plurality of radially and axially extending spokes 66 connecting the central portion and the rim portion.

The central portion 62 of the steering wheel 60 has a front side 68 facing toward the driver of the vehicle and a back side (not numbered) facing away from the driver of the vehicle. The front side 68 of the central portion 62 includes a front side surface 70 (FIG. 2) and the back side of the central portion includes a back side surface 72.

For ease of illustration, the known wiring associated with the air bag module 90 and the steering wheel 60, such as slip rings and clock springs, is not shown. Provisions to accommodate such wiring would nevertheless be provided in the structure shown in the Figures.

The central portion 62 of the steering wheel 60 includes a splined opening 74 which is centered on the axis 34 and which is configured to mesh with the splined end portion 36 of the steering shaft 32. The central portion 62 further includes a circumferentially spaced plurality of threaded apertures 76 encircling the splined opening 74, a circumferentially spaced plurality of threaded openings 78, and a second arcuate slot 80 which extends axially through the central portion. The second arcuate slot 80 is located for axial and radial alignment with the first arcuate slot 44 in the hub member 40 when the splined opening 74 in the steering wheel 60 is meshed with the splined end portion 36 of the steering shaft 32.

The air bag module 90 is attached to the front side surface 70 of the central portion 62 of the steering wheel 60. The air bag module 90 has an annular flange 92 with a circumferentially spaced plurality of clearance holes 94, each of which receives a respective one of a plurality of fasteners 96. Each of the fasteners 96 threads into a corresponding one of the plurality of threaded apertures 76 in the central portion 62 of the steering wheel 60 to secure the air bag module 90 to the steering wheel. This is one of many types of attachment schemes.

The steering wheel assembly 20 is removably attached to the steering shaft 32 by the attachment plate 110. The attachment plate 110 is located on the front side 68 of the central portion 62 of the steering wheel 60 underneath the air bag module 90. The attachment plate 110 is retained adjacent the front side surface 70 of the central portion 62 by a plurality of retaining tabs 112 so that the attachment plate floats between the retaining tabs and the front side surface 68 until the steering wheel 60 is attached to the steering shaft 32. The retaining tabs 112 are secured to the front side surface 70 of the central portion 62 of the steering wheel 60 by fasteners 114 which are received in the plurality of threaded openings 78 in the central portion.

The attachment plate 110 includes a circumferentially spaced plurality of guide holes 116 and a centrally located opening 118. The guide holes 116 are located for circumferential alignment with the second arcuate slot 80 in the central portion 62 of the steering wheel 60, as may be seen in FIG. 3. The opening 118 is partially covered by a nut 120 for mating with the threaded extension 38 at the end portion 36 of the steering shaft 32. The nut 120 is preferably welded to the attachment plate 110, but internal threads could alternatively be machined into the attachment plate.

To attach the steering wheel assembly 20 to the steering shaft 32, the steering wheel assembly is placed over the steering shaft. The threaded extension 38 and the splined end portion 36 of the steering shaft 32 are guided through the splined opening 74 in the central portion 62 of the steering wheel 60 until the back side surface 72 abuts the hub member 40. During this step, care is taken to ensure that the second arcuate slot 80 in the central portion 62 of the steering wheel 60 aligns with the first arcuate slot 44 in the hub member 40.

Next, a tool 140 is inserted through the aligned openings 54 in the enclosure member 50, through the aligned first and second arcuate slots 44 and 80, and into a respective one of the plurality of guide holes 116 in the attachment plate 110. The tool 140 can have a circular, square, or other shape in cross-section. It is contemplated that the cross-sectional shape of the tool 140 could be used to "key" the tool through the aligned openings 54 which could, for example, have a corresponding shape.

The steering wheel assembly 20 is then manually rotated, causing the steering shaft 32 to rotate along with it. The tool 140 and the attachment plate 110, however, do not rotate. The tool 140 slides in the arcuate slots 44 and 80 when the steering wheel assembly 20 is rotated. The tool 140 holds the attachment plate 110 stationary and the rotation of the steering shaft 32 causes the threaded extension 38 on the steering shaft to screw into the nut 120 on the attachment plate. The steering wheel assembly 20 can only be rotated a fraction of a turn, according to the length of the arcuate slots 44 and 80. The tool 140 is then moved to a different guide hole 116 in the attachment plate 110 and the steering wheel assembly 20 is rotated again to cause the nut 120 to screw itself farther down onto the extension 38 on the steering shaft 32. By incrementally performing this process, the steering wheel assembly 20 is tightened down onto the steering shaft 32.

The aforementioned process for attaching the steering wheel assembly 20 to the steering shaft 32 requires the steering wheel assembly to be rotated in order to attach it to the steering shaft. Accordingly, the vehicle's ignition key 58 must be in the ignition locking mechanism 56 so that the locking mechanism is deactivated and the steering shaft 32 can be rotated.

Likewise, removal of the steering wheel assembly 20 from the steering shaft 32 requires that the vehicle's ignition key 58 be inserted in the ignition locking mechanism 56 so that the steering shaft can be rotated. To remove the steering wheel assembly 20, the process described above is reversed. The tool 140 is inserted into one of the guide holes 116 in the attachment plate 110 to hold the attachment plate stationary while the steering wheel assembly 20 is manually rotated in an untightening direction. By incrementally rotating the steering wheel assembly 20 and then moving the tool 140 to a different hole 116 in the attachment plate 110 for the next incremental rotation, the nut 120 unscrews itself from the extension 38 on the steering shaft 32. Further, the tabs 112 act as reaction members and apply an axial force on the attachment plate 110 when the steering wheel assembly 20 is rotated to help disengage the steering wheel assembly from the steering shaft 32.

Because rotation of the steering wheel assembly 20 is required to accomplish the removal of the steering wheel 60 from the steering shaft 32, the apparatus 10 described above prevents removal of the steering wheel assembly without the vehicle's ignition key 58 and thus helps to prevent theft of the steering wheel assembly.

Figure 4:
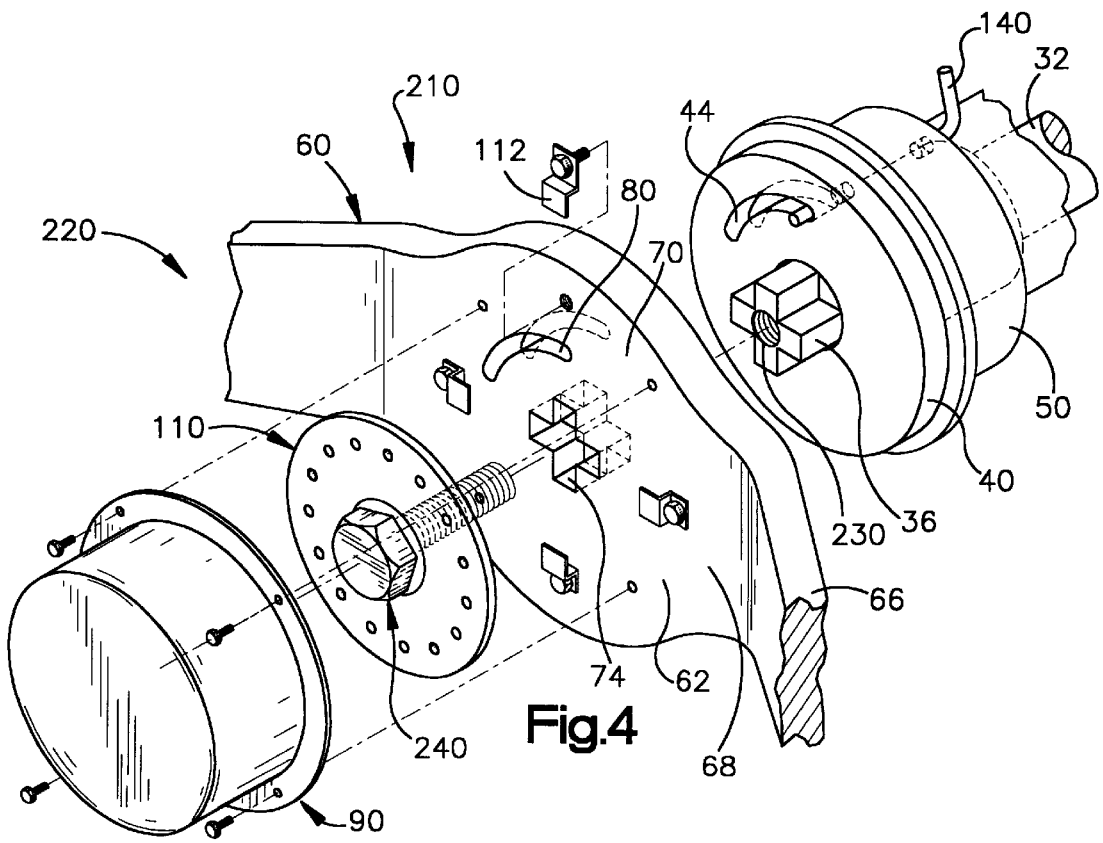
FIG. 4 is a view similar to FIG. 1 illustrating a second embodiment of the present invention.

FIG. 4 illustrates an apparatus 210 for a vehicle steering wheel assembly 220 constructed in accordance with a second embodiment of the present invention. In the second embodiment of FIG. 4, reference numbers identical to those of the first embodiment of FIGS. 1–3 are used to designate parts which are identical to parts in the first embodiment.

According to the second embodiment, the end portion 36 steering shaft has an internally threaded opening 230, rather than the threaded extension 38 of the previous embodiment. In addition, the nut 120 of the previous embodiment is replaced with a threaded fastener 240 which is welded to the attachment plate 110. The fastener 240 extends through the opening 118 in the attachment plate 110, through the opening 74 in the steering wheel 60, and is received in the threaded opening 230 in the steering shaft 32 to attach the steering wheel assembly 220 to the steering shaft.

The steering wheel assembly 220 is attached to and removed from the steering shaft 32 using the same tool 140 and the same incremental steering wheel rotation process described above with respect to the first embodiment. As with the first embodiment, the apparatus 210 according to the second embodiment requires rotation of the steering wheel assembly 220 to accomplish removal of the steering wheel 60 and thus requires that the vehicle's ignition key 58 be present in the ignition locking mechanism 56. Thus, the apparatus 210 helps to prevent theft of the steering wheel assembly 220.

Figure 5:
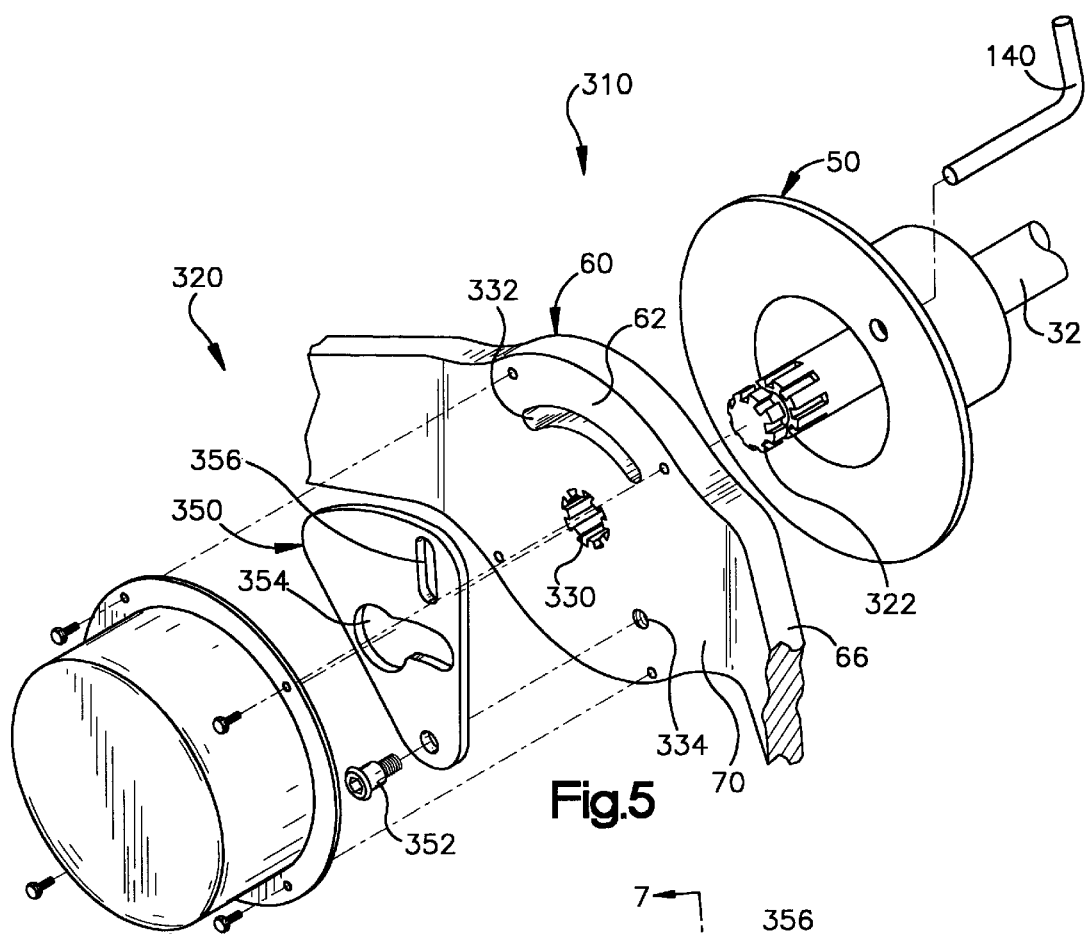
FIG. 5 is an exploded perspective view of a third embodiment of the present invention.
Figure 6:
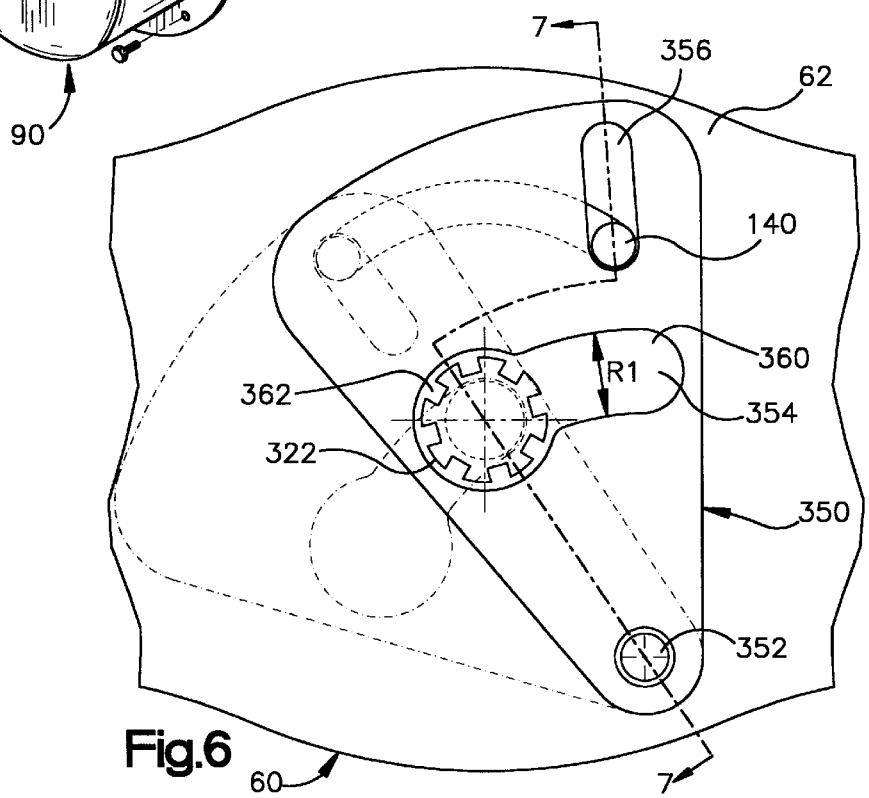
FIG. 6 is a plan view of parts shown in FIG. 5.
Figure 18:
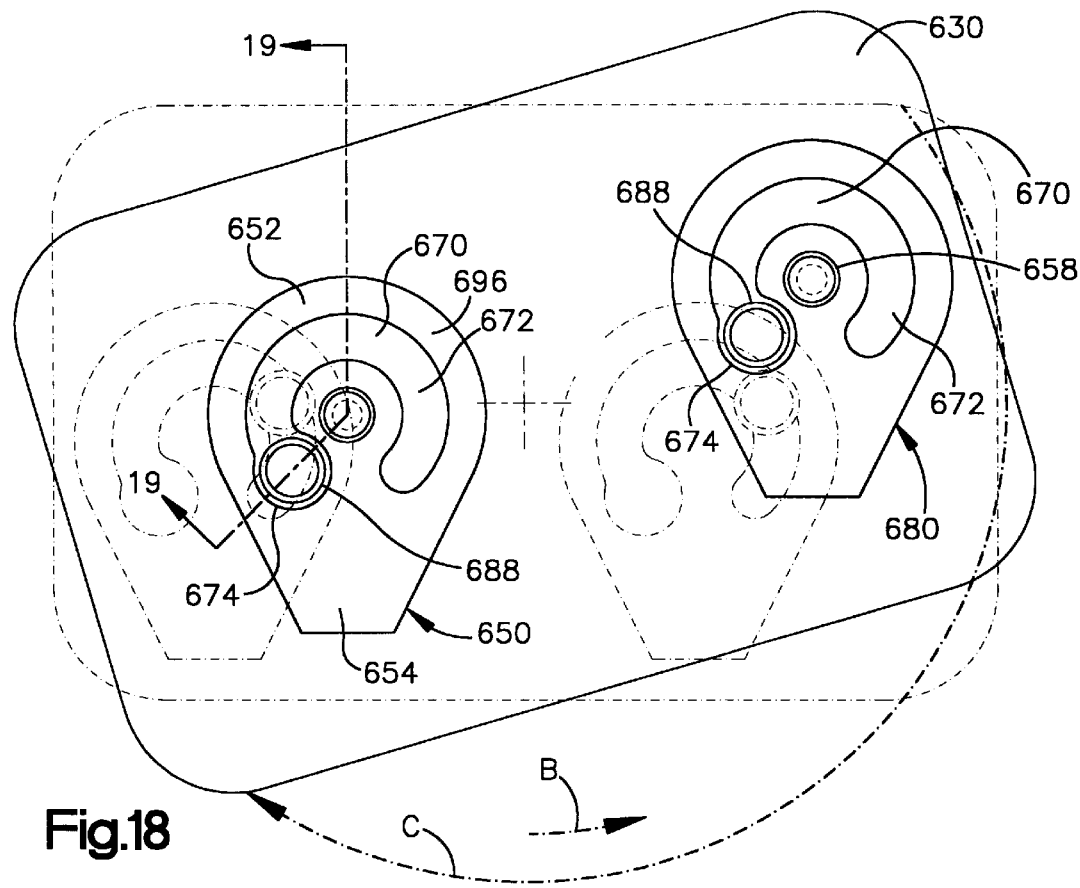
FIG. 18 is a view similar to FIG. 16 showing parts in different positions.

FIGS. 5–7 illustrate an apparatus 310 for a vehicle steering wheel assembly 320 constructed in accordance with a third embodiment of the present invention. In the third embodiment of FIGS. 5–7, reference numbers which are the same as those of the first embodiment of FIGS. 1–3 are used to designate parts which are similar to parts in the first embodiment.

According to the third embodiment, the end portion 36 of the steering shaft 32 includes a splined section 322 having an outer diameter D1 (FIG. 7). The end portion 36 of the steering shaft 32 further includes a neck section 324 defining an annular groove in the splined section 322. The neck section 324 has a diameter D2 which is less than the diameter D1 of the splined section 322.

The central portion 62 of the steering wheel 60 includes a centrally located splined opening 330 for meshing with the splined section 322 of the steering shaft 32. An arcuate slot 332 is located above the splined opening 330, and a mounting hole 334 is located in the lower right hand corner (as viewed in FIG. 5) of the central portion 62.

The steering wheel assembly 320 according to the third embodiment includes a generally triangular arm 350 pivotally mounted to the front side surface 70 of the central portion 62 of the steering wheel 60 underneath the air bag module 90. The arm 350 is pivotally mounted by a shoulder bolt 352 which is received in the mounting hole 334. The arm 50 includes a centrally located arcuate aperture 354 and a straight slot 356 located above (as viewed in FIG. 5) the arcuate aperture.

The arcuate aperture 354 has a slot section 360 and a circular section 362. It is contemplated that the circular section 362 of the arcuate aperture 354 could alternatively have a different shape, such as a square shape. The slot section 360 of the arcuate aperture 354 has a radial width R1 (FIG. 6) which is smaller than the diameter D1 of the splined section 322 of the steering shaft 32, but which is larger than the diameter D2 of the neck section 324 of the steering shaft. The circular section 362 of the arcuate aperture 354 has a diameter D3 (FIG. 7) which is larger than the diameter D1 of the splined section 322 of the steering shaft 32.

To attach the steering wheel assembly 320 to the steering shaft 32, the steering wheel assembly 320 is placed over the steering shaft. The splined section 322 is guided through the splined opening 330 in the steering wheel 60 until the back side surface 72 of the steering wheel rests against a shoulder 370 (FIG. 7) on the steering shaft 32. In this unlocked position, the terminal end of the splined section 322 of the steering shaft 32 projects from the circular section 362 of the arcuate aperture 354 in the arm 350, while the neck section 324 of the steering shaft is disposed in the circular section 362, as best seen in FIG. 7. The tool 140 is then inserted through an opening in the enclosure member 50, through the arcuate slot 332 in the steering wheel 60, and into the straight slot 356 in the arm 350 (FIG. 6).

Next, the steering wheel assembly 320 is rotated counterclockwise (to the left as viewed in FIG. 6). The rotation of the steering wheel assembly 320 causes the arm 350 to rotate. The tool 140 slides along the arcuate slot 332 in the steering wheel 60 and moves up (as viewed in FIG. 6) in the straight slot 356 in the arm 350. The tool 140 functions to limit the rotational movement of the arm so that the steering wheel assembly 320 rotates relative to the arm 350. This causes the neck section 324 of the steering shaft 32 to be pulled into the slot section 360 of the arcuate aperture 354 in the arm 350 as shown in dotted lines in FIG. 6. A radially extending surface 380 (FIG. 7) of the splined section 322 of the steering shaft 32 frictionally engages the surface of the arm 350 surrounding the slot section 360 of the aperture 354 to secure the steering wheel assembly 320 axially in a locked position. The tool 140 is then removed so that the arm 350 rotates with the steering wheel 60 and the steering shaft 32.

Removal of the steering wheel assembly 320 from the steering shaft 32 involves a reversal of the process described above. The tool 140 is re-inserted into the straight slot 356 in the arm 350 and the steering wheel assembly 320 is rotated clockwise (to the right as viewed in FIG. 6). The neck section 324 of the steering shaft 32 is thus pulled out of the slot section 360 of the arcuate aperture 354 in the arm 350, and the surface 380 of the splined section 322 is pulled out of engagement with the surface of the arm into the unlocked position. A detent (not shown) may be used to keep the arm 350 in place during this process. Alternatively, the arm 350 may be constructed with a slight curvature in the axial direction so that the arm will engage the front side surface 70 of the steering wheel 60 and be tensioned to hold the arm in place during removal of the steering wheel.

As with the first embodiment, the apparatus 310 requires rotation of the steering wheel assembly 320 to accomplish removal of the steering wheel 60. The apparatus 310 thus requires that the vehicle's ignition key 58 be present in the ignition locking mechanism 56 for removal of the steering wheel 60. Thus, the apparatus helps to prevent theft of the steering wheel assembly 320.

FIGS. 8–11 illustrate an apparatus 410 for a steering wheel assembly 420 constructed in accordance with a fourth embodiment of the present invention. More particularly, the apparatus 410 prevents theft of the driver-side air bag module 90 mounted on the vehicle steering wheel 60. In the fourth embodiment of FIGS. 8–11, reference numbers which are the same as those of the first embodiment of FIGS. 1–3 are used to designate parts which are similar to parts in the first embodiment.

According to the fourth embodiment of the present invention, the steering wheel 60 is attached to the steering shaft 32 in a known manner, such as by splines (not shown) and a set screw 422 inserted radially through an extension 424 on the steering wheel 60. The central portion 62 of the steering wheel 60 includes an arcuate slot 430. The air bag module 90 includes a mounting plate 440 which has diametrically opposed first and second slots 442 and 444, respectively.

The air bag module 90 is removably connected on the front side 68 of the steering wheel 60 by an arm 450 located underneath the air bag module. The arm 450 has a central portion 452 which is pivotally mounted on the axis 34 in the central portion 62 of the steering wheel 60. First and second end portions 454 and 456, respectively, of the arm 450 extend radially from the central portion 452 in opposite directions. The first end portion 454 of the arm 450 has an axially offset first tab portion 458 and an aperture 460 adjacent the first tab portion. The aperture 460 aligns with the arcuate slot 430 in the steering wheel 60. The second end portion 456 of the arm 450 has an axially offset second tab portion 462. The first and second tab portions 458 and 462 are dimensioned so as to fit into the first and second slots 442 and 444, respectively, in the mounting plate 440 of the air bag module 90.

To attach the air bag module 90 to the steering wheel 60, the air bag module is placed over the arm 450 on the front side 68 of the steering wheel 60 so that the first and second slots 442 and 440 axially overlie the first and second tab portions 458 and 462, respectively, as shown in FIG. 10. In this unlocked position, the axially offset first and second tab portions 458 and 462 extend axially through the first and second slots 442 and 440, respectively.

Next, the tool 140 is inserted through the opening 54 in the stationary enclosure member 50, through the arcuate slot 430 in the steering wheel 60, and into the aperture 460 in the first end portion 454 of the arm 450. The steering wheel 60 is then manually rotated to the left as viewed in the Figures, while the tool 140 holds the arm 350 stationary. The rotation of the steering wheel 60 causes the mounting plate 440 to rotate so that the first and second tab portions 458 and 462 axially overlap respective surface portions 470 and 472 of the mounting plate 440 surrounding the first and second slots 442 and 440, respectively, as shown in FIG. 11. The tab portions 458 and 462 frictionally engage the surrounding surface portions 470 and 472, respectively, to secure the air bag module 90 in a locked position. Screws (not shown) can also be used to secure the air bag module 90 in the locked position for normal driving.

Removal of the air bag module 90 from the steering wheel 60 involves a reversal of the process described above. The tool 140 is re-inserted into the aperture 460 in the arm 450 and the steering wheel is rotated to the right as viewed in the Figures. The first and second tab portions 458 and 460 are thereby pulled out of frictional engagement with the surfaces 470 and 472, respectively, of the mounting plate 440 and back into the first and second slots 442 and 444, respectively.

As with the previous embodiments, the apparatus 410 according to the fourth embodiment requires rotation of the steering wheel 60 to accomplish removal and thus requires that the vehicle's ignition key 58 be present in the ignition locking mechanism 56, thereby helping to prevent theft of the air bag module 90.

FIGS. 12–14 illustrate an apparatus 510 for a steering wheel assembly constructed 520 in accordance with a fifth embodiment of the present invention. More particularly, the apparatus 510 prevents theft of the driver-side air bag module 90 mounted on the vehicle steering wheel 60. In the fifth embodiment of FIGS. 12–14, reference numbers which are the same as those of the first embodiment of FIGS. 1–3 are used to designate parts which are similar to parts in the first embodiment.

According to the fifth embodiment of the present invention, the steering wheel 60 is attached to the steering shaft 32 in a known manner. One such manner is by splines (not shown) and a nut 522 screwed onto a threaded extension 524 of the steering shaft 32 which projects through a central opening 526 in the steering wheel. The central portion 62 of the steering wheel 60 includes a circumferentially spaced plurality of apertures 530.

The air bag module 90 includes a mounting plate 540 having a circumferentially spaced plurality of threaded openings 542 which align with the plurality of apertures 530 in the steering wheel 60. The air bag module 90 is removably connected to the front side 68 of the steering wheel 60 by a plurality of threaded fasteners 544 which engage the threaded openings 542 in the mounting plate 530.

The apparatus 510 includes a lock plate 550 pivotally supported on the steering shaft 32 on the back side of the steering wheel 60. The lock plate 550 has a circumferentially spaced plurality of clearance holes 552 which are alignable with the plurality of apertures 530 in the steering wheel 60 and with the plurality of threaded openings 542 in the mounting plate 540. The lock plate 550 further has a tool hole 554 for receiving the tool 140.

In the embodiment of FIGS. 12–14, the enclosure member 50 includes a circumferentially spaced plurality of access openings 560 which are alignable with the plurality of clearance holes 552 in the lock plate 550. The enclosure member 50 also has an arcuate tool slot 562 which aligns with the tool hole 554 in the lock plate.

To attach the air bag module 90 to the steering wheel 60, the air bag module is placed on the front side surface 70 of the steering wheel so that the threaded openings 542 in the mounting plate 540 align with the apertures 530 in the steering wheel 60. The tool 140 is inserted through the tool slot 562 and into the tool hole 554 in the lock plate 550. The steering wheel 60 is then manually rotated while the tool 140 holds the lock plate 550 stationary. The steering wheel 60 is rotated until the plurality of threaded openings 542 in the mounting plate 530 are visibly aligned with the plurality of clearance holes 552 in the lock plate 550. The fasteners 544 are then inserted through the access holes 560 in the enclosure member 50, through the clearance holes 552 in the lock plate 550, through the apertures 530 in the steering wheel 60, and into the threaded openings 542 in the mounting plate 530 of the air bag module 90. After the fasteners 544 are tightened, the steering wheel 60 is further rotated from the position shown in FIG. 13 in the direction of arrow A in FIG. 14 to the position shown in FIG. 14 so that the lock plate 550 blocks the access to the fasteners 544. The tool 140 is then removed.

Removal of the air bag module 90 from the steering wheel 60 involves a reversal of the process described above. The tool 140 is re-inserted into the tool hole 554 in the lock plate 550 and the steering wheel 60 is rotated opposite the direction of arrow A so that the fasteners 544 again become visibly aligned with the clearance holes 552 in the lock plate 550 and the access holes 560 in the enclosure member 50. The fasteners 544 are then unscrewed to disconnect the air bag module 90 from the steering wheel 60.

As with the previous embodiments, the apparatus 510 according to the fourth embodiment requires rotation of the steering wheel 60 to accomplish removal. Thus, the apparatus 510 requires that the vehicle's ignition key 58 be present in the ignition locking mechanism 56, thereby helping to prevent theft of the air bag module 90.

FIGS. 15–19 illustrate an apparatus 610 for a steering wheel assembly 620 constructed in accordance with a sixth embodiment of the present invention. More particularly, the apparatus 610 prevents theft of the driver-side air bag module 90 mounted on the vehicle steering wheel 60. In the sixth embodiment of FIGS. 15–19, reference numbers which are the same as those of the first embodiment of FIGS. 1–3 are used to designate parts which are similar to parts in the first embodiment.

According to the sixth embodiment of the present invention, the steering wheel 60 is attached to the steering shaft 32 in a known manner, such as by splines (not shown) and an axial fastener 622. The steering wheel 60 includes a base plate 630 overlying the front side surface 70 in the central portion 62 of the steering wheel. The base plate 630 is spaced axially from the front side surface 70. The base plate 630 is generally rectangular in shape and is attached to the steering wheel 60 in a manner not shown. The base plate 630 has an upper surface 632 (FIG. 17) facing toward the air bag module 90 and a lower surface 634 facing toward the steering shaft 32. First and second clearance holes 636 (FIG. 19) and 638 (FIG. 17), respectively, extend between the upper and lower surfaces 632 and 634, respectively, of the base plate 630. First and second threaded openings 640 and 642 (FIG. 17), respectively, are located adjacent the first and second clearance holes 636 and 638, respectively.

The steering wheel 60 further includes first and second lock washers 650 and 680, respectively, pivotally mounted to the lower surface 634 of the base plate 630, immediately above the front side surface 70 of the steering wheel. The first and second lock washers 650 and 680 are identical in configuration and therefore only the first lock washer 650 is described in detail. It is contemplated that more than two lock washers could be used, or that only one lock washer could be used.

Figures 17, 19:
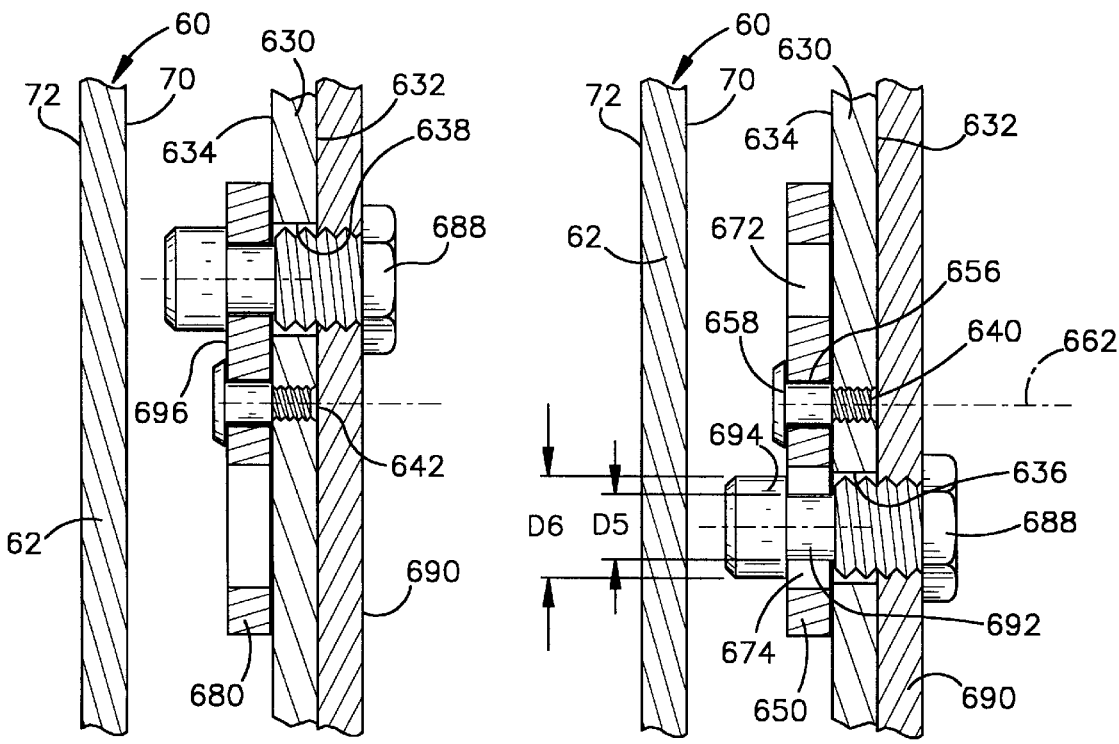
FIG. 17 is a sectional view taken along line 17—17 in FIG. 16.
FIG. 19 is a sectional view taken along line 19—19 in FIG. 18.

The lock washer 650 has a cam-like shape defined by a semi-circular portion 652 (FIG. 16) and a frustoconical portion 654. A centrally located opening 656 (FIG. 19) in the circular portion of the lock washer 650 receives a fastener 658 for mounting the lock washer for pivotal movement about a pivot center 660 (FIG. 16) which lies on a pivot axis 662 (FIG. 19). The cam-like shape of the lock washer 650 causes the lock washer to have a center of gravity 664 (FIG. 16) which is radially offset from its pivot center 660 in the direction of the frustoconical portion 654 of the lock washer.

The lock washer 650 includes an arcuate aperture 670 having a slot section 672 and a circular section 674 disposed at one end of the arcuate aperture. The slot section 672 of the arcuate aperture 670 in the lock washer 650 has a constant radial width W1. The circular section 674 of the arcuate aperture 670 in the lock washer 650 has a diameter D4 which is greater than the radial width W1 of the slot section 672.

The air bag module 90 according to the sixth embodiment of the present invention includes a pair of identical fasteners 688 which project axially from a module mounting plate 690. Each fastener 688 includes a shank portion 692 having a diameter D5 and an end portion 694 having a diameter D6 which is greater than the diameter D5 of the shank portion. The diameter D6 of the end portion 694 of each fastener 688 is larger than the radial width W1 of the slot section 674 of the arcuate aperture 670 in each lock washer 650, 680. The diameter D6 of the end portion 694 is smaller than the diameter D4 of the circular section 674 of the arcuate aperture 670 in each lock washer 650, 680. The diameter D5 of the shank portion 692 of each fastener 688 is smaller than the radial width W1 of the slot section 672 of the arcuate aperture 670 in each lock washer 650, 680.

To attach the air bag module 90 to the steering wheel 60, the steering wheel is turned to a position which is atypical for a parked vehicle, such as 90° or 180° from the straight ahead position. The fasteners 688 are inserted through the first and second clearance holes 636 and 638, respectively, in the base plate 630 and into respective circular sections 674 of the first and second lock washers 650 and 680, respectively. In this position, shown in solid lines in FIG. 18 and in FIG. 19, the air bag module 90 is not yet locked to the steering wheel 60. The steering wheel assembly 620 is then manually rotated in the direction indicated by arrow B in FIG. 18. Because the center of gravity 664 of each of the lock washers 650, 680 is radially offset from their respective pivot centers 660, the lock washers do not rotate but instead maintain their orientation during the rotation of the steering wheel 60. The rotation of the air bag module 90 causes the shank portion 692 of each of the fasteners 688 to slide into a corresponding slot section 672 of a respective arcuate aperture 674 in the lock washers 650 and 680, as shown by the dotted lines in FIG. 18 and in solid lines in FIG. 16. In this position, the end portion 694 of each of the fasteners 688 frictionally engages a surface 696 (FIG. 16) of each of the lock washers 650, 680 to secure the air bag module 90 to the steering wheel 60 in a locked position which is shown in FIG. 17. Screws (not shown) can also be used to secure the air bag module 90 in the locked position for normal driving.

Removal of the air bag module 90 from the steering wheel 60 requires the process described above to be reversed. The steering wheel assembly 620 is rotated in the direction of arrow C in FIG. 18 to cause the shank portion 692 of each fastener 688 to be moved out of the slot section 672 of the arcuate aperture 670 in one of the lock washers 650 and 680 and into the circular section 674 of the arcuate aperture. With the shank portion 692 of each fastener 688 located in the circular section 674 of each arcuate aperture 670, the air bag module 90 is pulled axially to remove it from the steering wheel 60. It should be understood that the attachment structure of the apparatus 610 according to the sixth embodiment could alternatively be reversed such that the lock washers 650, 680 were mounted on the air bag module 90 and the fasteners 688 extended from the steering wheel 60.

As with the previous embodiments, the apparatus 610 according to the sixth embodiment requires rotation of the steering wheel 60 to accomplish removal. The apparatus 610 thus requires that the vehicle's ignition key 58 be present in the ignition locking mechanism 56, thereby helping to prevent theft of the air bag module 90.

Figure 20:
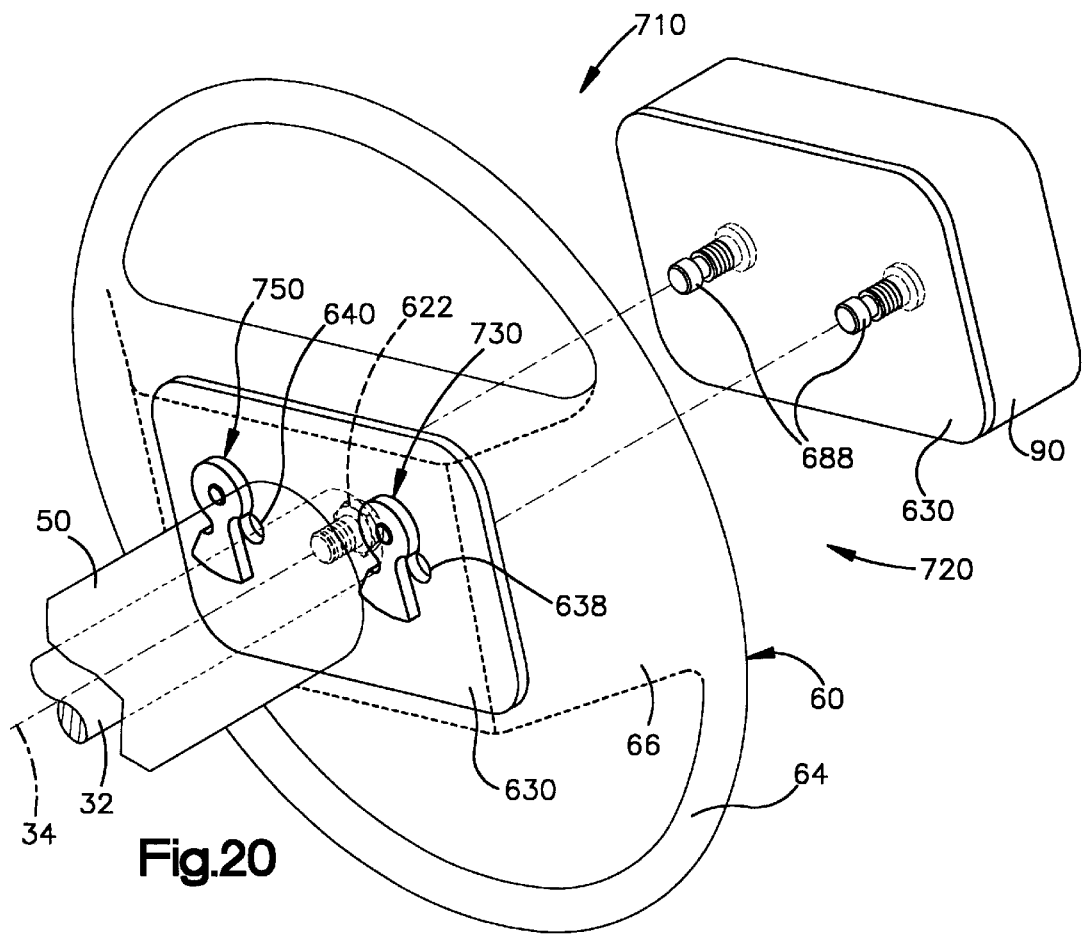
FIG. 20 is a view similar to FIG. 15 illustrating a seventh embodiment of the present invention.
Figure 21:
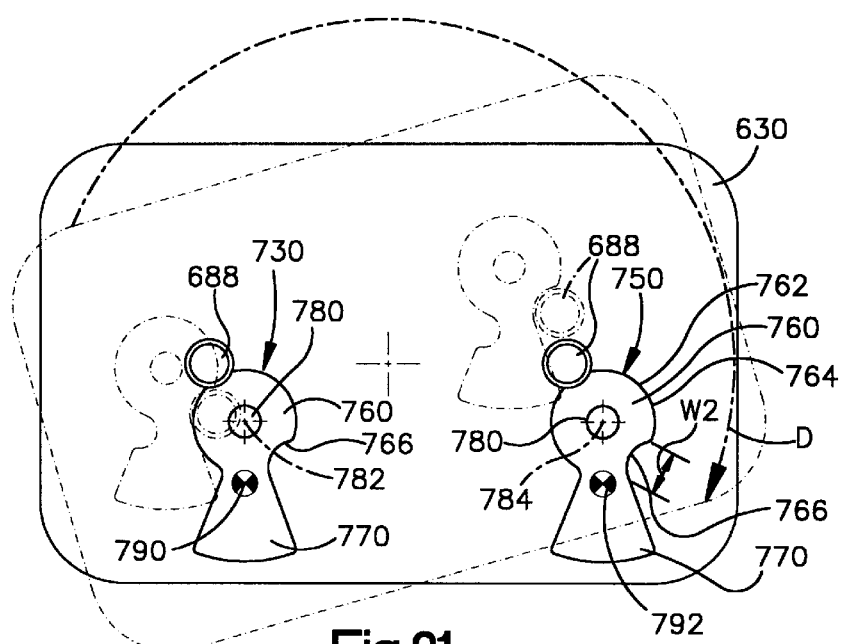
FIG. 21 is a plan view similar to FIG. 18 showing parts illustrated in FIG. 20.

FIGS. 20 and 21 illustrate an apparatus 710 for a steering wheel assembly 720 constructed in accordance with a seventh embodiment of the present invention. More particularly, the apparatus 710 prevents theft of the driver-side air bag module 90 mounted on the vehicle steering wheel 60. In the seventh embodiment of FIGS. 20 and 21, reference numbers which are the same as those of the sixth embodiment of FIGS. 15–19 are used to designate parts which are similar to parts in the sixth embodiment.

According to the seventh embodiment of the present invention, the steering wheel 60 includes first and second lock washers 730 and 750, respectively, pivotally mounted to the lower surface 634 of the base plate 630 above the front side surface 70 of the steering wheel 60. It is contemplated that more than two lock washers could be used, or that only one lock washer could be used.

The first and second lock washers 730 and 750 are identical in configuration. Each of the lock washers 730, 750 has a cam-like shape defined by a partially circular portion 760 and a radially extending projecting portion 770. The partially circular portion 760 is defined by an arcuate outer surface 762 having a semicircular section 764 and an arcuate notch 766 adjacent the projecting portion 770 of each lock washer 730, 750. The arcuate notch 766 has a width W2. The diameter D6 of the end portion 694 of each fastener 688 which projects from the air bag module 90 is smaller than the width W2 of the arcuate notch 766 in the outer surface 762 of each lock washer 730, 750.

A centrally located opening (not shown) in the partially circular portion 760 of each of the first and second lock washers 730 and 750 receives a fastener 780 for mounting each lock washer for pivotal movement about a pivot center 782 and 784, respectively, for each lock washer. The cam-like shape of the first and second lock washers 730 and 750 provides them with centers of gravity 790 and 792, respectively, which are radially offset from their pivot center 782 and 784, respectively, in the direction of the projecting portion 770 of each lock washer.

To attach the air bag module 90 to the steering wheel 60, the steering wheel is turned to a position which is atypical for a parked vehicle, such as 90° or 180°. The fasteners 688 are inserted through the first and second clearance holes 638 and 640 in the base plate 630 and into the respective arcuate notches 766 in the outer surfaces 762 of the first and second lock washers 730 and 750. In this position shown in dotted lines in FIG. 21, the air bag module 90 is not yet locked to the steering wheel 60. The steering wheel assembly 720 is then manually rotated in the direction indicated by arrow D in FIG. 21. Because the center of gravity 790, 792 for each of the first and second lock washers 730 and 750, respectively, is radially offset from their respective pivot centers 782 and 784, the lock washers do not rotate but instead maintain their orientation during the rotation of the steering wheel 60. The rotation of the air bag module 90 causes the end portion 694 of each of the fasteners 688 to slide over and axially abut the surface of the semi-circular section 760 of each of the first and second lock washers 730 and 750, as shown by the solid lines in FIG. 21. In this position, the end portion 694 of each fastener 688 frictionally engages the surface of the respective lock washer 730, 750 to secure the air bag module 90 to the steering wheel 60 in a locked position. Screws (not shown) can also be used to secure the air bag module 90 in the locked position for normal driving.

Removal of the air bag module 90 from the steering wheel 60 requires the process described above to be reversed. The steering wheel assembly 720 is rotated opposite the direction of arrow D to cause the end portion 694 of each fastener 688 to be moved back into the arcuate notch 766 in a respective one of the lock washers 730, 750. With the end portions 694 of the fasteners 688 located in the arcuate notches 766, the air bag module 90 is pulled axially to remove it from the steering wheel 60. It should be understood that the attachment structure of the apparatus 610 according to the sixth embodiment could alternatively be reversed such that the lock washers 730, 750 were mounted on the air bag module 90 and the fasteners 780 extended from the steering wheel 60.

As with the previous embodiments, the apparatus 710 according to the seventh embodiment requires rotation of the steering wheel 60 to accomplish removal. The apparatus 710 thus requires that the vehicle's ignition key 58 be present in the ignition locking mechanism 56, thereby helping to prevent theft of the air bag module 90.

Figure 22:
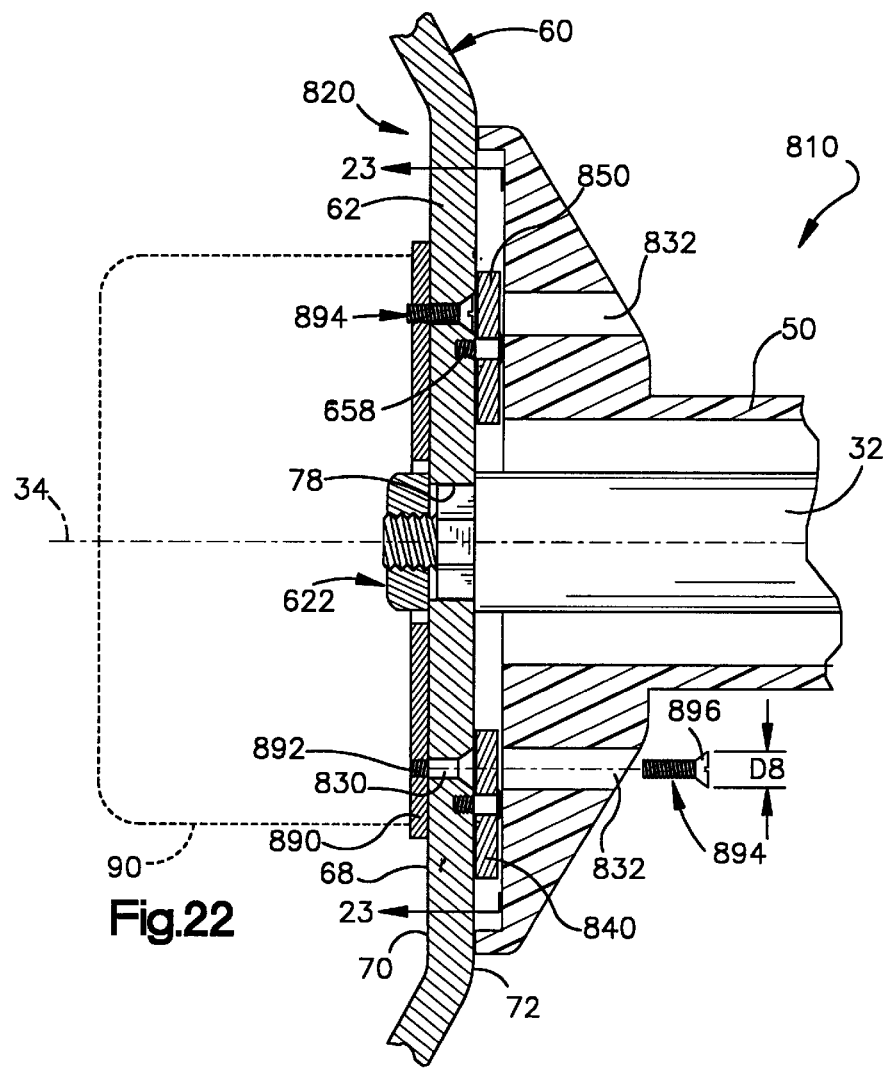
FIG. 22 is a partial sectional view of an eighth embodiment of the present invention.
Figure 23:
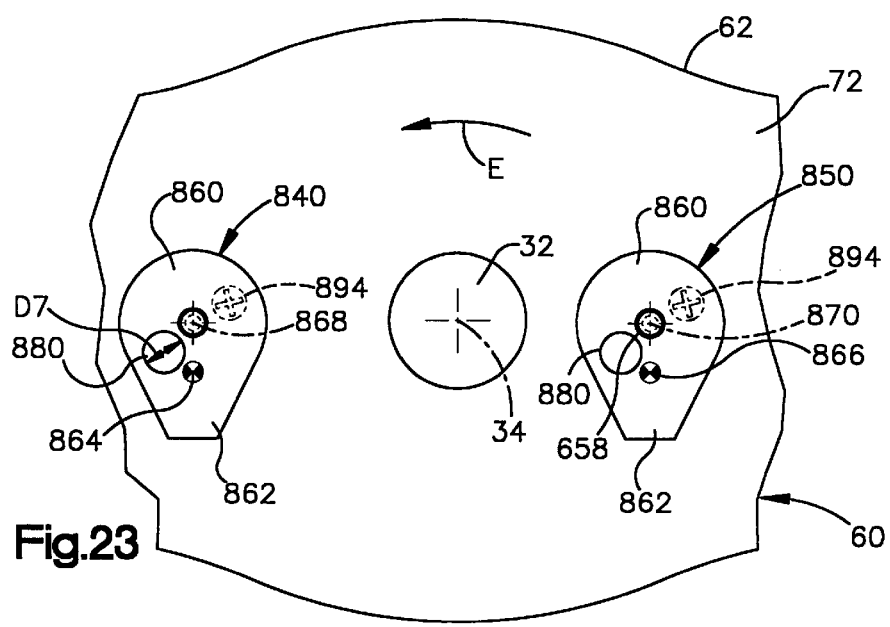
FIG. 23 is a plan view similar to FIG. 16 showing parts illustrated in FIG. 22.

FIGS. 22 and 23 illustrate an apparatus 810 for a steering wheel assembly 820 constructed in accordance with an eighth embodiment of the present invention. More particularly, the apparatus 810 helps prevent theft of the driver-side air bag module 90 mounted on the vehicle steering wheel 60. In the eighth embodiment of FIGS. 22 and 23, reference numbers which are the same as those of the sixth embodiment of FIGS. 15–19 are used to designate parts which are similar to parts in the sixth embodiment.

According to the eighth embodiment of the present invention, the steering wheel 60 is attached to the steering shaft 32 in a known manner, such as by splines (not shown) and the axial fastener 622. The steering wheel 60 includes a pair of countersunk clearance holes 830 disposed on either side of the opening 78 through the central portion 62 of the steering wheel. The enclosure member 50 surrounding the steering shaft 32 includes access openings 832 which align with the pair of clearance holes 830 in the steering wheel 60.

The steering wheel 60 further includes first and second lock washers 840 and 850, respectively, pivotally mounted to the back side surface 72 of the steering wheel 60. The first and second lock washers 840 and 850 are identical in configuration. Each of the lock washers 840, 850 has a cam-like shape defined by a semicircular portion 860 and a frustoconical portion 862. The cam-like shape of the lock washers 840 and 850 provides them with a center of gravity 864 and 866, respectively, which is radially offset from a respective pivot center 868 and 870 in the direction of the frustoconical portion 862 of each lock washer. Each of the lock washers 840 and 850 includes an aperture 880 which is alignable with one of the clearance holes 830 in the steering wheel 60. The apertures 880 are shown as having a circular shape, but could alternatively have another shape.

The air bag module 90 according to the eighth embodiment of the present invention has a module mounting plate 890 with a pair of threaded openings 892 which align with clearance holes 830 in the steering wheel 60. The air bag module 90 is attached to the steering wheel 60 by a pair of threaded fasteners 894. Each of the threaded fasteners 894 includes a head portion 896 with a diameter D8 which is smaller than the diameter D7 of the apertures 880.

To attach the air bag module 90 to the steering wheel 60, the steering wheel assembly 820 is manually rotated in the direction indicated by arrow E in FIG. 23. The rotation is continued until the apertures 880 in the lock washers 840, 850 align with the holes 830 in the steering wheel 60 and the openings 892 in the mounting plate 890. Because the center of gravity 864, 866 for each of the lock washers 840, 850 is radially offset from the corresponding pivot center 868, 870, the lock washers do not rotate but instead maintain their orientation during the rotation of the steering wheel 60. In this position, the fasteners 894 are inserted through the access holes 832 and the apertures 880 into the clearance holes 830 and the openings 892 in the mounting plate 890. Once the fasteners 894 have been tightened, the air bag module 90 is secured to the steering wheel 60. Subsequent rotation of the steering wheel assembly 820 causes the lock washers 840, 860 to cover over the fasteners 894 and thereby restrict access to the fasteners. Thus, as with the previous embodiments, the apparatus 810 according to the eighth embodiment requires rotation of the steering wheel 60 to accomplish removal. The apparatus 810 thus requires that the vehicle's ignition key 58 be present in the ignition locking mechanism 56, thereby helping to prevent theft of the air bag module 90.

Figure 24:
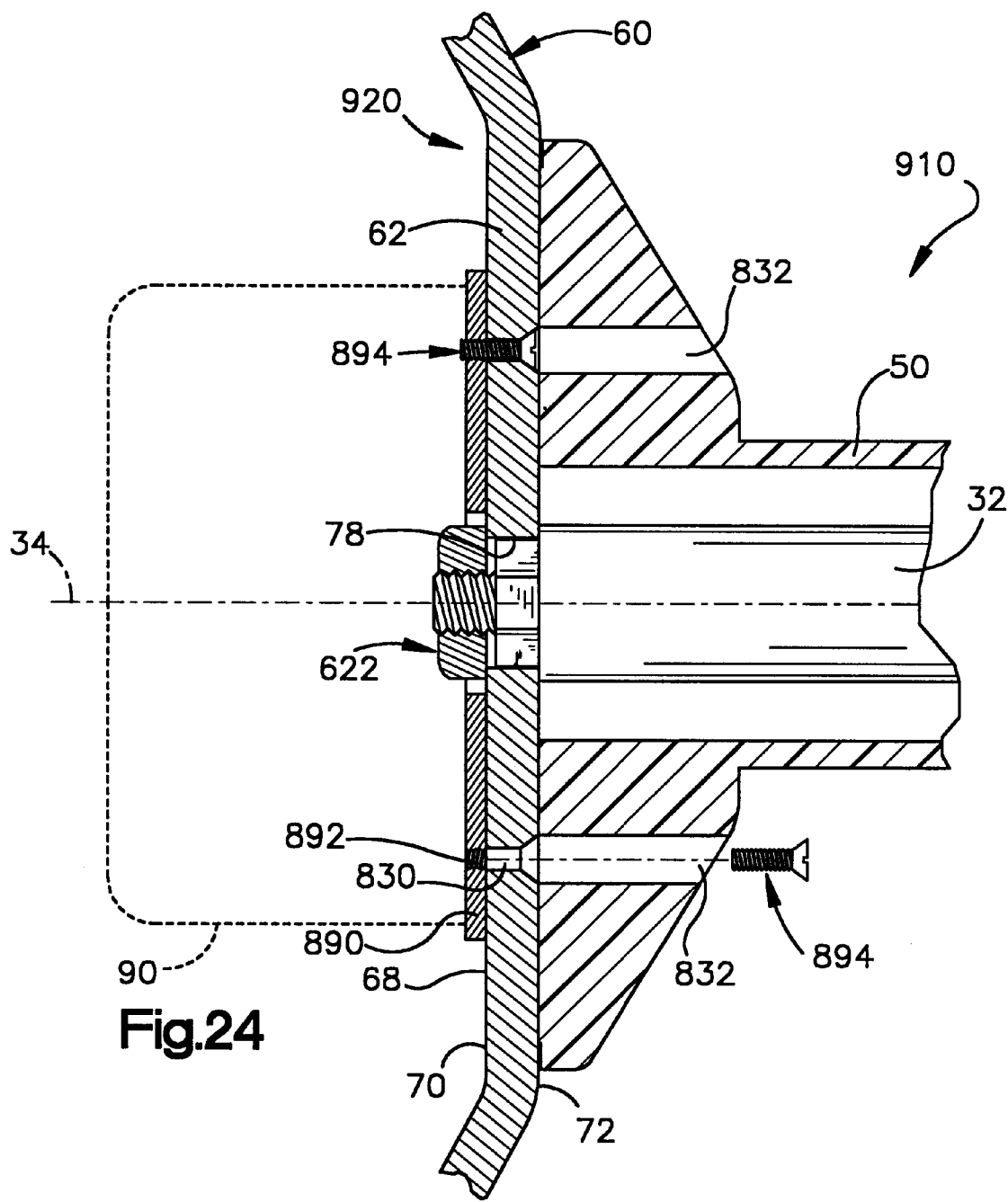
FIG. 24 is a partial sectional view of a ninth embodiment of the present invention.

FIG. 24 illustrates an apparatus 910 for a steering wheel assembly 920 constructed in accordance with an eighth embodiment of the present invention. More particularly, the apparatus 910 helps prevent theft of the driver-side air bag module 90 mounted on the vehicle steering wheel 60. In the ninth embodiment of FIG. 24, reference numbers which are the same as those of the eighth embodiment of FIGS. 22 and 23 are used to designate parts which are similar to parts in the eighth embodiment.

According to the ninth embodiment of the present invention, the steering wheel 60 is attached to the steering shaft 32 in a known manner, such as by splines (not shown) and the axial fastener 622. The steering wheel 60 includes a pair of countersunk clearance holes 830 disposed on either side of the opening 78 through the central portion 62 of the steering wheel. The stationary enclosure member 50 surrounding the steering shaft 32 includes access openings 832 which are alignable with the pair of clearance holes 830 in the steering wheel 60.

The air bag module 90 according to the ninth embodiment of the present invention has a module mounting plate 890 with a pair of threaded openings 892 which align with clearance holes 830 in the steering wheel 60. The air bag module 90 is secured to the steering wheel 60 by a pair of threaded fasteners 894 as described below.

To attach the air bag module 90 to the steering wheel 60, the steering wheel assembly 920 is manually rotated until the holes 830 in the steering wheel 60 and the openings 892 in the mounting plate 890 align with the access openings 832 in the enclosure member 50. In this position shown in FIG. 24, the fasteners 894 are inserted through the access holes 832 into the clearance holes 830 and the openings 892 in the mounting plate 890. Once the fasteners 894 have been tightened, the air bag module 90 is secured to the steering wheel 60. Subsequent rotation of the steering wheel assembly 820 causes the access openings 832 to move out of alignment with the holes 830 and the openings 892 such that access to the fasteners 894 is prevented. Thus, as with the previous embodiments, the apparatus 910 according to the ninth embodiment requires rotation of the steering wheel 60 to accomplish removal. The apparatus 910 thus requires that the vehicle's ignition key 58 be present in the ignition locking mechanism 56, thereby helping to prevent theft of the air bag module 90.

From the above description of the invention, those skilled in the art will perceive improvements, changes and modifications. Such improvements, changes and modifications within the skill of the art are intended to be covered by the appended claims.

Having described the invention, I claim:

1. An apparatus for use in a vehicle having a rotatable steering shaft and locking means for preventing rotation of the steering shaft, the locking means for preventing rotation of the steering shaft being deactivated by an ignition key in the vehicle's ignition, said apparatus comprising:

a vehicle steering wheel having a front side facing a driver of the vehicle and a back side facing away from the driver;

an inflatable vehicle occupant protection device for helping to protect the driver of the vehicle in a vehicle collision; and means for removably connecting said inflatable vehicle occupant protection device with the steering shaft, said means for removably connecting said inflatable vehicle occupant protection device requiring rotation of said steering wheel to accomplish removal of said inflatable vehicle occupant protection device from the steering shaft.

2. The apparatus of claim 1 wherein said means for removably connecting said inflatable vehicle occupant protection device with the steering shaft comprises means for removably attaching said steering wheel to the steering shaft.

3. The apparatus of claim 2 wherein said means for removably attaching said steering wheel to the steering shaft comprises splines on said steering wheel for meshing with splines on the steering shaft and an attachment plate located on said front side of said steering wheel, said attachment plate being retained on said front side of said steering wheel by a plurality of retaining tabs.

4. The apparatus of claim 3 wherein said attachment plate includes a circumferentially spaced plurality of apertures for receiving a tool for holding said attachment plate stationary during rotation of said steering wheel and a centrally located threaded fastener for mating with a threaded portion of the steering shaft.

5. The apparatus of claim 2 wherein said means for removably attaching said steering wheel to the steering shaft comprises internally directed splines on said steering wheel for meshing with externally directed splines on the steering shaft and an arm pivotally mounted on said front side of said steering wheel.

6. The apparatus of claim 5 wherein said arm includes a centrally located arcuate aperture having a slot section with a radial width which is smaller than the diameter of an axial end portion of the steering shaft but which is greater than the diameter of a neck portion of the steering shaft adjacent the axial end portion, said arcuate aperture having a circular section with a diameter which is greater than the diameter of the axial end portion of the steering shaft, said arm being pivotable upon rotation of said steering wheel between an unlocked position in which the neck portion of the steering shaft is disposed in said circular section of said arcuate aperture in said arm and a locked position in which the neck portion of the steering shaft is disposed in said slot section of said arcuate aperture.

7. The apparatus of claim 1 wherein said means for removably connecting said inflatable vehicle occupant protection device with the steering shaft includes means for removably connecting said inflatable vehicle occupant protection device to said steering wheel.

8. The apparatus of claim 7 wherein said means for removably connecting said inflatable vehicle occupant protection device to said steering wheel comprises an arm pivotally mounted on said front side of said steering wheel, said arm comprising a central portion pivotally attached to said steering wheel and radially extending first and second end portions disposed opposite one another, said first end portion having an axially offset first tab portion and said second end portion having an axially offset second tab portion, said first end portion including an aperture adjacent said first tab portion, said aperture for receiving a tool for holding said arm stationary during rotation of said steering wheel.

9. The apparatus of claim 8 wherein said inflatable vehicle occupant protection device includes a mounting having diametrically opposed first and second slots, said arm being pivotable upon rotation of said steering wheel between an unlocked position in which said first and second slots axially overlie said first and second tab portions, respectively, and a locked position in which said first tab portion axially overlaps a portion of said mounting plate surrounding said first slot and said second tab portion axially overlaps another portion of said mounting plate surrounding said second slot.

10. The apparatus of claim 7 wherein said inflatable vehicle occupant protection device includes a mounting plate having at least one threaded opening and said steering wheel includes at least one aperture which is axially aligned with said at least one threaded opening.

11. The apparatus of claim 10 wherein said means for removably connecting said inflatable vehicle occupant protection device to said steering wheel comprises a lock plate pivotally mounted on said back side of said steering wheel and at least one threaded fastener for receipt in said at least one threaded opening in said mounting plate of said inflatable vehicle occupant protection device, said lock plate having at least one clearance hole which is alignable with said at least one aperture in said steering wheel and with said at least one threaded opening in said mounting plate, said lock plate being pivotable upon rotation of said steering wheel between a first position in which said at least one clearance hole in said lock plate does not align with said at least one aperture in said steering wheel and with said at least one threaded opening in said mounting plate and a second position in which said at least one clearance hole in said lock plate aligns with said at least one aperture in said steering wheel and with said at least one threaded opening in said mounting plate.

12. The apparatus of claim 7 wherein said means for removably connecting said inflatable vehicle occupant protection device to said steering wheel comprises at least one lock washer, said at least one lock washer being pivotable about a pivot center and having a center of gravity which is radially offset from said pivot center and which causes said at least one lock washer to maintain its orientation during rotation of said steering wheel, said at least one lock washer including an arcuate aperture circumscribing said pivot center, said arcuate aperture having a slot section and a circular section, said slot section of said arcuate aperture having an approximately constant radial width and said circular section having a diameter which is greater than said radial width of said slot section.

13. The apparatus of claim 12 wherein said means for removably connecting said inflatable vehicle occupant protection device to said steering wheel further comprises at least one fastener, said at least one fastener including a shank portion having a first diameter and an end portion having a second diameter which is larger than said first diameter of said shank portion, said second diameter of said end portion of said at least one fastener being larger than said radial width of said slot section of said arcuate aperture and being smaller than said diameter of said circular section of said arcuate aperture, said first diameter of said shank portion of said at least one fastener being smaller than said radial width of said slot section of said arcuate aperture.

14. The apparatus of claim 13 wherein said inflatable vehicle occupant protection device has a locked position in which said shank portion of said at least one fastener is disposed in said slot section of said arcuate aperture in said at least one lock washer, said inflatable vehicle occupant protection device having an unlocked position in which said shank portion of said at least one fastener is disposed in said circular section of said arcuate aperture in said at least one lock washer, said inflatable vehicle occupant protection device being movable from said locked position to said unlocked position by rotation of said steering wheel.

15. The apparatus of claim 7 wherein said means for removably connecting said inflatable vehicle occupant protection device to said steering wheel comprises at least one lock washer, said at least one lock washer being pivotable about a pivot center and having a center of gravity which is radially offset from said pivot center and which causes said at least one lock washer to maintain its orientation during rotation of said steering wheel, said at least one lock washer including an arcuate outer surface circumscribing said pivot center, said outer surface including a semicircular section and an arcuate notch having a width.

16. The apparatus of claim 15 wherein said means for removably connecting said inflatable vehicle occupant protection device to said steering wheel further comprises at least one fastener, said at least one fastener including a shank portion having a first diameter and an end portion having a second diameter which is larger than said first diameter of said shank portion, said second diameter of said end portion of said at least one fastener being larger than said width of said notch in said outer surface of said at least one lock washer.

17. The apparatus of claim 16 wherein said inflatable vehicle occupant protection device has a locked position in which said end portion of said at least one fastener axially overlies and abuts said semicircular section of said outer surface of said at least one lock washer, said inflatable vehicle occupant protection device having an unlocked position in which said end portion of said at least one fastener is disposed in said arcuate notch in said outer surface of said at least one lock washer, said inflatable vehicle occupant protection device being movable from said locked position to said unlocked position by rotation of said steering wheel.

18. The apparatus of claim 7 wherein said means for removably connecting said inflatable vehicle occupant protection device to said steering wheel comprises at least one lock washer pivotally mounted on said back side of said steering wheel and at least one threaded fastener, said at least one lock washer being pivotable about a pivot center and having a center of gravity which is radially offset from said pivot center and which causes said at least one lock washer to maintain its orientation during rotation of said steering wheel, said at least one lock washer including an aperture having a diameter, said at least one threaded fastener including a head portion having a diameter which is smaller than said diameter of said aperture in said at least one lock washer.

19. The apparatus of claim 18 wherein said inflatable vehicle occupant protection device includes a mounting plate having at least one threaded opening for receiving said at least one threaded fastener and said steering wheel includes at least one aperture in said at least one lock washer which is axially aligned with said at least one threaded opening, said aperture in said at least one lock washer being alignable with said at least one aperture in said steering wheel and with said at least one threaded opening in said mounting plate.

20. The apparatus of claim 19 wherein said inflatable vehicle occupant protection device has a first position in which aperture in said at least lock washer does not align with said at least one threaded fastener located in said at least one threaded opening in said mounting plate and thereby restricts access to said at least one threaded fastener, said inflatable vehicle occupant protection device having a second position in which said aperture in said at least lock washer aligns with said at least one threaded fastener located in said at least one threaded opening in said mounting plate and thereby permits access to said at least one threaded fastener, said inflatable vehicle occupant protection device being movable from said first position to said second position by rotation of said steering wheel.

21. An apparatus for use in a vehicle having a rotatable steering shaft and locking means for preventing rotation of the steering shaft, the locking means for preventing rotation of the steering shaft being deactivated by an ignition key in the vehicle's ignition, said apparatus comprising:

a vehicle steering wheel having a front side facing a driver of the vehicle and a back side facing away from the driver;

an inflatable vehicle occupant protection device for helping to protect the driver of the vehicle in a vehicle collision, said inflatable vehicle occupant protection device being attached to said steering wheel on said front side of said steering wheel; and means for removably attaching said steering wheel to the steering shaft, said means for removably attaching said steering wheel requiring rotation of said steering wheel to accomplish removal of said steering wheel from the steering shaft.

22. The apparatus of claim 21 wherein said means for removably attaching said steering wheel to the steering shaft comprises splines on said steering wheel for meshing with splines on the steering shaft and an attachment plate located on said front side of said steering wheel, said attachment plate being retained on said front side of said steering wheel by a plurality of retaining tabs.

23. The apparatus of claim 22 wherein said attachment plate includes a circumferentially spaced plurality of apertures for receiving a tool for holding said attachment plate stationary during rotation of said steering wheel and a centrally located threaded fastener for mating with a threaded portion of the steering shaft.

24. The apparatus of claim 21 wherein said means for removably attaching said steering wheel to the steering shaft comprises internally directed splines on said steering wheel for meshing with externally directed splines on the steering shaft and an arm pivotally mounted on said front side of said steering wheel.

25. The apparatus of claim 24 wherein said arm includes a centrally located arcuate aperture having a first section with a radial width which is smaller than the diameter of an axial end portion of the steering shaft but which is greater than the diameter of a neck portion of the steering shaft adjacent the axial end portion, said arcuate aperture having a second section with a size which is greater than the diameter of the axial end portion of the steering shaft, said arm being pivotable upon rotation of said steering wheel between an unlocked position in which the neck portion of the steering shaft is disposed in said second section of said arcuate aperture in said arm and a locked position in which the neck portion of the steering shaft is disposed in said first section of said arcuate aperture.

26. An apparatus for use in a vehicle having a rotatable steering shaft and locking means for preventing rotation of the steering shaft, the locking means for preventing rotation of the steering shaft being deactivated by an ignition key in the vehicle's ignition, said apparatus comprising:

a vehicle steering wheel for rotation with the steering shaft, said steering wheel having a front side facing a driver of the vehicle and a back side facing away from the driver;

an inflatable vehicle occupant protection device for helping to protect the driver of the vehicle in a vehicle collision; and means for removably connecting said inflatable vehicle occupant protection device to said steering wheel, said means for removably connecting said inflatable vehicle occupant protection device requiring rotation of said steering wheel to accomplish removal of said inflatable vehicle occupant protection device from said steering wheel.

27. The apparatus of claim 26 wherein said means for removably connecting said inflatable vehicle occupant protection device to said steering wheel comprises an arm pivotally mounted on said front side of said steering wheel, said arm comprising a central portion pivotally attached to said steering wheel and radially extending first and second end portions disposed opposite one another, said first end portion having an axially offset first tab portion and said second end portion having an axially offset second tab portion, said first end portion including an aperture adjacent said first tab portion, said aperture for receiving a tool for holding said arm stationary during rotation of said steering wheel.

28. The apparatus of claim 27 wherein said inflatable vehicle occupant protection device includes a mounting having diametrically opposed first and second slots, said arm being pivotable upon rotation of said steering wheel between an unlocked position in which said first and second slots axially overlie said first and second tab portions, respectively, and a locked position in which said first tab portion axially overlaps a portion of said mounting surrounding said first slot and said second tab portion axially overlaps another portion of said mounting surrounding said second slot.

29. The apparatus of claim 26 wherein said inflatable vehicle occupant protection device includes a mounting plate having at least one threaded opening and said steering wheel includes at least one aperture which is axially aligned with said at least one threaded opening.

30. The apparatus of claim 29 wherein said means for removably connecting said inflatable vehicle occupant protection device to said steering wheel comprises a lock plate pivotally mounted on said back side of said steering wheel and at least one threaded fastener for receipt in said at least one threaded opening in said mounting plate of said inflatable vehicle occupant protection device, said lock plate having at least one clearance hole which is alignable with said at least one aperture in said steering wheel and with said at least one threaded opening in said mounting plate, said lock plate being pivotable upon rotation of said steering wheel between a first position in which said at least one clearance hole in said lock plate does not align with said at least one aperture in said steering wheel and with said at least one threaded opening in said mounting plate and a second position in which said at least one clearance hole in said lock plate aligns with said at least one aperture in said steering wheel and with said at least one threaded opening in said mounting plate.

31. The apparatus of claim 26 wherein said means for removably connecting said inflatable vehicle occupant protection device to said steering wheel comprises at least one lock washer, said at least one lock washer being pivotable about a pivot center and having a center of gravity which is radially offset from said pivot center and which causes said at least one lock washer to maintain its orientation during rotation of said steering wheel, said at least one lock washer including an arcuate aperture circumscribing said pivot center, said arcuate aperture having a slot section and a circular section, said slot section of said arcuate aperture having an approximately constant radial width and said circular section having a diameter which is greater than said radial width of said slot section.

32. The apparatus of claim 31 wherein said means for removably connecting said inflatable vehicle occupant protection device to said steering wheel further comprises at least one fastener, said at least one fastener including a shank portion having a first diameter and an end portion having a second diameter which is larger than said first diameter of said shank portion, said second diameter of said end portion of said at least one fastener being larger than said radial width of said slot section of said arcuate aperture and being smaller than said diameter of said circular section of said arcuate aperture, said first diameter of said shank portion of said at least one fastener being smaller than said radial width of said slot section of said arcuate aperture.

33. The apparatus of claim 32 wherein said inflatable vehicle occupant protection device has a locked position in which said shank portion of said at least one fastener is disposed in said slot section of said arcuate aperture in said at least one lock washer, said inflatable vehicle occupant protection device having an unlocked position in which said shank portion of said at least one fastener is disposed in said circular section of said arcuate aperture in said at least one lock washer, said inflatable vehicle occupant protection device being movable from said locked position to said unlocked position by rotation of said steering wheel.

34. The apparatus of claim 26 wherein said means for removably connecting said inflatable vehicle occupant protection device to said steering wheel comprises at least one lock washer, said at least one lock washer being pivotable about a pivot center and having a center of gravity which is radially offset from said pivot center and which causes said at least one lock washer to maintain its orientation during rotation of said steering wheel, said at least one lock washer including an arcuate outer surface circumscribing said pivot center, said outer surface including a semicircular section and an arcuate notch having a width.

35. The apparatus of claim 34 wherein said means for removably connecting said inflatable vehicle occupant protection device to said steering wheel further comprises at least one fastener, said at least one fastener including a shank portion having a first diameter and an end portion having a second diameter which is larger than said first diameter of said shank portion, said second diameter of said end portion of said at least one fastener being smaller than said width of said notch in said outer surface of said at least one lock washer.

36. The apparatus of claim 35 wherein said inflatable vehicle occupant protection device has a locked position in which said end portion of said at least one fastener axially overlies and abuts said semicircular section of said outer surface of said at least one lock washer, said inflatable vehicle occupant protection device having an unlocked position in which said end portion of said at least one fastener is disposed in said arcuate notch in said outer surface of said at least one lock washer, said inflatable vehicle occupant protection device being movable from said locked position to said unlocked position by rotation of said steering wheel.

37. The apparatus of claim 26 wherein said means for removably connecting said inflatable vehicle occupant protection device to said steering wheel comprises at least one lock washer pivotally mounted on said back side of said steering wheel and at least one threaded fastener, said at least one lock washer being pivotable about a pivot center and having a center of gravity which is radially offset from said pivot center and which causes said at least one lock washer to maintain its orientation during rotation of said steering wheel, said at least one lock washer including an aperture having a diameter, said at least one threaded fastener including a head portion having a diameter which is smaller than said diameter of said aperture.

38. The apparatus of claim 37 wherein said inflatable vehicle occupant protection device includes a mounting plate having at least one threaded opening for receiving said at least one threaded fastener and said steering wheel includes at least one aperture which is axially aligned with said at least one threaded opening, said aperture in said at least one lock washer being alignable with said at least one aperture in said steering wheel and with said at least one threaded opening in said mounting plate.

39. The apparatus of claim 38 wherein said inflatable vehicle occupant protection device has a first position in which said aperture in said at least lock washer does not align with said at least one threaded fastener located in said at least one threaded opening in said mounting plate and thereby restricts access to said at least one threaded fastener, said inflatable vehicle occupant protection device having a second position in which said aperture in said at least lock washer aligns with said at least one threaded fastener located in said at least one threaded opening in said mounting plate and thereby permits access to said at least one threaded fastener, said inflatable vehicle occupant protection device being movable from said first position to said second position by rotation of said steering wheel.

40. The apparatus of claim 26 wherein said means for removably connecting said inflatable vehicle occupant protection device to said steering wheel comprises at least one threaded fastener, said inflatable vehicle occupant protection device including a mounting plate having at least one threaded opening for receiving said at least one threaded fastener and said steering wheel including at least one aperture which is axially aligned with said at least one threaded opening.

41. An apparatus for use in a vehicle, said apparatus comprising:

an assembly including a rotatable steering shaft and a rotatable steering wheel;

actuatable locking means for, when actuated, preventing rotation of said assembly;

an inflatable vehicle occupant protection device for helping to protect the driver of the vehicle in a vehicle collision; and means for releasably connecting said inflatable vehicle occupant protection device with said steering wheel upon deactuation of said locking means and rotation of said steering wheel.

* * * * *